US012645894B2

(12) United States Patent
Akiyama et al.

(10) Patent No.: US 12,645,894 B2
(45) Date of Patent: Jun. 2, 2026

(54) SPEECH TRANSLATION PROCESSING APPARATUS

(71) Applicant: MAXELL, LTD., Kyoto (JP)

(72) Inventors: Hitoshi Akiyama, Otukuni-gun (JP); Ryuji Nishimura, Otukuni-gun (JP)

(73) Assignee: Maxell, Ltd., Kyoto (JP)

( * ) Notice: Subject to any disclaimer, the term of this patent is extended or adjusted under 35 U.S.C. 154(b) by 244 days.

(21) Appl. No.: 18/038,156

(22) PCT Filed: Nov. 25, 2020

(86) PCT No.: PCT/JP2020/043769
§ 371 (c)(1),
(2) Date: May 22, 2023

(87) PCT Pub. No.: WO2022/113189
PCT Pub. Date: Jun. 2, 2022

(65) Prior Publication Data
US 2024/0370669 A1      Nov. 7, 2024

(51) Int. Cl.
G06F 40/58 (2020.01)
G10L 15/00 (2013.01)
G10L 15/30 (2013.01)

(52) U.S. Cl.
CPC ............ G06F 40/58 (2020.01); G10L 15/005 (2013.01); G10L 15/30 (2013.01)

(58) Field of Classification Search
CPC ....... G06F 40/58; G06F 40/40; G10L 15/005; G10L 15/30; G10L 13/00; G10L 15/00; G10L 15/03
See application file for complete search history.

(56) References Cited

U.S. PATENT DOCUMENTS 8,825,468 B2 * 9/2014 Jacobsen ................. G06F 40/58
351/158
11,182,567 B2 * 11/2021 Furukawa ............... G06F 40/58
(Continued)

FOREIGN PATENT DOCUMENTS

CN        109582976      *  4/2019  ............. G06F 40/40
JP        2002-10138 A        1/2002
(Continued)

OTHER PUBLICATIONS

International Search Report issued in corresponding International Patent Application No. PCT/JP2020/043769, dated Jan. 12, 2021, with English translation.

*Primary Examiner* — Abdelali Serrou
(74) *Attorney, Agent, or Firm* — Rimon P.C.

(57) ABSTRACT

A speech translation processing apparatus including a speech inputter and a speech outputter operated in cooperation with a wearable speech input/output apparatus worn on a user, includes a translation speech acquirer acquiring translation speech in a user language or the other language that is translated and generated on the basis of a spoken speech in the user language or the other language input through the wearable speech input/output apparatus or the speech inputter, and a translation speech output controller performing control such that the acquired translation speech is output from at least one of the speech outputter and the wearable speech input/output apparatus in an output mode according to a translation condition. According to such a configuration, it is possible to provide a user-friendly translation system.

12 Claims, 20 Drawing Sheets

(56)                     References Cited

U.S. PATENT DOCUMENTS

| | | | | |
|---|---|---|---|---|
| 11,328,131 B2 * | 5/2022 | Orlick | ...................... | G10L 15/26 |
| 12,327,091 B2 * | 6/2025 | Matusov | ................. | G10L 15/26 |
| 2003/0149557 A1 | 8/2003 | Cox et al. | | |
| 2007/0036367 A1 * | 2/2007 | Ko | ................... | G10K 11/17885 |
| | | | | 381/71.1 |
| 2011/0307241 A1 * | 12/2011 | Waibel | .................... | G06F 40/44 |
| | | | | 704/2 |
| 2015/0095011 A1 * | 4/2015 | Furihata | ................ | G06F 40/263 |
| | | | | 704/2 |
| 2017/0046326 A1 * | 2/2017 | Waibel | ................. | G06F 3/0486 |

FOREIGN PATENT DOCUMENTS

| | | | | | |
|---|---|---|---|---|---|
| JP | 2003-271597 A | | 9/2003 | | |
| JP | 2008-243080 A | | 10/2008 | | |
| JP | 2017-151619 A | | 8/2017 | | |
| JP | 2018-173910 A | | 11/2018 | | |
| JP | 2018173910 | * | 11/2018 | ............ | G06F 17/28 |
| JP | 2020-113150 A | | 7/2020 | | |
| WO | WO/2019/030811 | * | 2/2019 | ............ | G06F 17/28 |

* cited by examiner

S1 : SPEECH INPUT 1

S2 : SPEECH INPUT 2

$S3 : S2 - a \times S1$

S4 : TRANSLATION SPEECH

S6:
(S1 or S2 or S3)
+S4

S7

SPEECH TRANSLATION PROCESSING APPARATUS

CROSS-REFERENCE OF RELATED APPLICATION

This application is the U.S. National Phase under 35 U.S.C. § 371 of International Patent Application No. PCT/JP2020/043769, filed on Nov. 25, 2020, the entire disclosure of which Application is incorporated by reference herein.

TECHNICAL FIELD

The present invention relates to a translator, and in particular, relates to speech translation processing apparatus of which the usability is improved.

BACKGROUND ART

In accordance with development in a speech recognition technology, a machine translation technology, a speech synthesis technology, and the like, a conversation in people speaking in different languages using a speech translator has become a reality. An example of such a translator is disclosed in Patent Document 1.

CITATION LIST

Patent Document

Patent Document 1: JP 2017-151619 A

SUMMARY OF THE INVENTION

Problems to be Solved by the Invention

In Patent Document 1, a translation machine that includes a mic to perform speech input before translation, a speaker to perform speech output after translation, an input switch to start speech input, and the like, and performs speech translation from a first language (for example, a native language) to a second language (a foreign language) or from the second language to the first language by manipulating the input switch with one hand is described.

In the translation machine described in such Patent Document 1, a configuration is adopted in which translation to the other language is performed by recognizing a language speech input between pressing and releasing the input switch, and the speech after translation is output.

However, in order for a conversation between a speaker of the first language and a speaker of the second language by using the translation machine described above, a manipulation of pressing the input switch every time when each of the speakers alternately speaks is required, and thus, there is a problem that the manipulation becomes complicated.

In addition, for example, in a case where one speaker is an owner who knows a manipulation method of the translation machine, and the other speaker is a foreigner who does not know the manipulation method, there is a problem that usability is degraded, and a burden on the owner side increases.

Specifically, in the case of performing the manipulation of pressing the input switch in both of a speaking point of the owner and a speaking point of a partner (the other person) (that is, in a case where the owner side retains the translation machine), it is necessary for the owner of the translation machine to perform a switch manipulation by waiting for a speaking start and end timing of the other person, but such a manipulation is complicated, and there is a concern that a time gap occurs.

As another measure, it is also considered that the manipulation method of the translation machine is explained in advance to the person, and then, the translation machine is passed to the person when the person speaks, but the person is a foreigner speaking a foreign language (in other words, a person who is not capable of having a conversation without the translation machine), and thus, such a measure is not realistic.

In general, in an apparatus or a system of the related art that performs speech translation, the usability is generally degraded, and it is considered that improvement is required in terms of ease of use.

An object of the present invention is to provide a more user-friendly translation processing apparatus.

Solutions to Problems

In order to attain the object described above, the representative embodiment of the present invention is a speech translation processing apparatus including a speech inputter and a speech outputter operated in cooperation with a wearable speech input/output apparatus worn on a user, the apparatus including:

a translation speech acquirer acquiring translation speech in a user language or the other language that is translated and generated on the basis of a spoken speech in the user language or the other language that are input; and a translation speech output controller performing control such that the acquired translation speech is output from at least one of the speech outputter and the wearable speech input/output apparatus in an output mode according to a translation condition.

Effects of the Invention

According to the present invention, it is possible to attain a more user-friendly translation processing apparatus with a simple manipulation by outputting the translation speech in the output mode according to the translation condition while ensuring a plurality of input/output paths of speech.

BRIEF DESCRIPTION OF THE DRAWINGS

FIG. 15 is a diagram illustrating a schematic configuration of a speech translation system in a third embodiment.

MODE FOR CARRYING OUT THE INVENTION

Hereinafter, embodiments to which the present invention is applied will be described in detail, with reference to the drawings.

[Outline of System]

Figure 1:
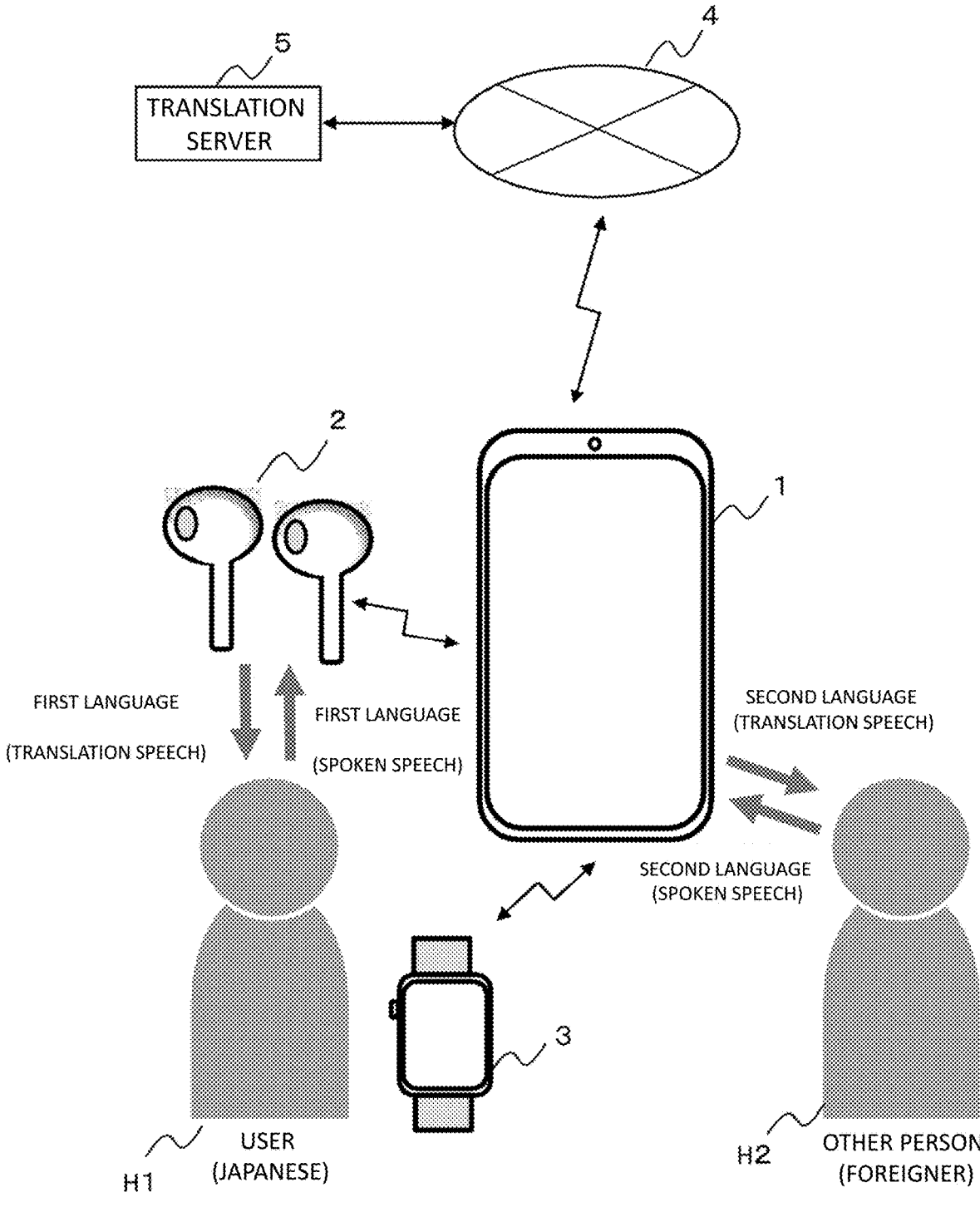
FIG. 1 is a diagram illustrating a schematic configuration of a speech translation system in a first embodiment and a second embodiment of the present invention.

Hereinafter, the embodiments to which the present invention is applied will be described. FIG. 1 is a diagram illustrating an outline configuration of a speech translation system in a first embodiment and a second embodiment.

In the speech translation system of each of the embodiments, a mobile terminal 1 having a speech translation function is used.

Here, "having a speech translation function" indicates performing some processing pieces according to speech translation. More specifically, the processing according to the speech translation includes:

(1) processing of inputting speech spoken by a speaker (as a speech signal from a mic or the like);

(2) processing of generating a pre-translation character string (text data) in a language by recognizing the input speech (the type of language or the like);

(3) processing of converting the generated pre-translation character string (text data) to the corresponding character string (text data) in the other language set in advance (for example, machine translation) (hereinafter, the converted character string will be referred to as a "translation character string");

(4) processing of generating the speech of the translation character string (synthesizing the speech signal); and (5) processing of outputting the speech of the translation character string (from a speaker or the like).

In addition, in this embodiment, the mobile terminal 1 also performs (6) processing of performing text display of the pre-translation character string and the translation character string described above on a displayer such as a display, as the processing according to the speech translation.

In general, in a case where resources such as hardware or resource of the mobile terminal 1 can be sufficiently ensured (for example, in a case where the mobile terminal 1 is a dedicated machine or a laptop PC), it is desirable that the mobile terminal 1 performs all the processing pieces of (1) to (6) described above.

On the other hand, in each of the embodiments, as the mobile terminal 1, for example, it is a terminal called a smart phone, that is, it is premised that be used an apparatus that is smaller and lighter than a notebook PC or the like and that cannot necessarily secure sufficient the above resources.

Accordingly, in the speech translation system of each of the embodiments, the mobile terminal 1 does not perform the processing of (3) among the processing pieces of (1) to (6) described above, but allows an external translation server 5 (refer to FIG. 1) to perform such processing.

In other words, the mobile terminal 1 of each of the embodiments has the function of a "speech recognizer" generating the text (the pre-translation character string) in the spoken language by recognizing the language from the input speech signal, and a "speech synthesizer" synthesizing the speech signal of the translation character string by acquiring the translation character string.

On the other hand, the mobile terminal 1 does not have the function of "language conversion" or "machine translation" of converting the generated pre-translation character string (text data) to the corresponding character string (text data) in the other language set in advance, but has the function of transmitting and receiving data according to translation (text data or the like) by wireless communication.

In one specific example, the mobile terminal 1 implements all the functions relevant to speech translation by downloading an application having the functions of (1), (2), and (4) to (6) described above from an application server that is not illustrated and the function of transmitting and receiving the data according to translation. Then, the mobile terminal 1 is connected to a known translation 5 server through a network 4 by activating the application with the manipulation of a user.

According to such a configuration, it is possible to reduce a load on the resources or the like such as a processor or a memory of the mobile terminal 1.

Further, in the speech translation system of each of the embodiments, a wearable speech input/output apparatus 2 including a speech inputter and a speech outputter is used by being connected to the mobile terminal 1. From another viewpoint, in each of the embodiments, the mobile terminal 1 allows the wearable speech input/output apparatus 2 to perform a part of the (1) speech input processing before translation and a part of the (5) speech output processing after translation, among the processing pieces of (1) to (6) described above.

Here, the wearable speech input/output apparatus 2 is an apparatus that can be worn on the head, the neck, the ear canal, or the like, for example, an earphone with a microphone (hereinafter, simply referred to as a "mic"), a wireless earphone with a mic, a headset, and the like, and includes various apparatuses capable of having a handsfree conversation in cooperation with the mobile terminal 1.

The wearable speech input/output apparatus 2 may be either an auxiliary apparatus of the mobile terminal 1 or a separate apparatus independent from the mobile terminal 1.

In the speech translation system of each of the embodiments, as described above, the following advantages can be obtained by ensuring a plurality of (in this example, two)

input paths of the spoken speech before translation (a so-called live sound) and a plurality of output paths of translation speech after translation generated by various processing pieces relevant to translation.

For example, in a case where a first language (for example, a Japanese language) to be a mutual translation target and a second language (for example, a Chinese language) are set, as illustrated in FIG. 1, an input destination and an output destination of the speech (a spoken speech and a translation speech) in the first language can be set to the wearable speech input/output apparatus 2, and an input destination and an output destination of a spoken speech and a translation speech in the second language can be set to the mobile terminal 1.

As described above, by automatically and exclusively switching the input/output paths of the speech, in accordance with a setting language, both of a user H1 who is Japanese and the other person H2 who is a foreigner are free from the cumbersomeness of the switch manipulation. In addition, it is possible to dissolve complication such as the necessity of transferring the mobile terminal 1 to a person or explaining a manipulation method to the person for each alternate speaking of each speaker, and to improve usability.

Hereinafter, an example will be described in which a wireless earphone with a mic (refer to FIG. 1) is used as the wearable speech input/output apparatus 2.

Note that, as an additional configuration of the speech translation system, a wearable display apparatus 3 having a display function, such as a smart watch, can also be used (refer to FIG. 1), and an operation also using such a wearable display apparatus 3 will be described below in the second embodiment.

Hereinafter, the outline of the operation of the mobile terminal 1, the wearable speech input/output apparatus 2, and the translation server 5 in the speech translation system of each of the embodiments will be described.

Note that, for facilitating the understanding, in the application described above that is implemented in the mobile terminal 1, the "Japanese language" is set as the first language (a user language) that is generally used (spoken) by the user, and the "Chinese language" is set as the second language (the other language) that is used (spoken) by the other person (the foreigner or the like) other than the user, and it is assumed that the other person is Chinese.

First, the user H1 (refer to FIG. 1) who is the owner of the mobile terminal 1 and the wearable speech input/output apparatus 2 (in this example, a Japanese owner who knows a manipulation and a usage) manipulates the mobile terminal 1, and thus, the application having a speech translation function, which is implemented in the mobile terminal 1, is activated.

After such activation of the application, the speech inputter (in this example, the mic of the mobile terminal 1 and the wearable speech input/output apparatus 2) is turned on (in an active state), an analog speech signal input to the speech inputter is suitably converted to digital data, and speech recognition processing is performed.

In this case, in a case where the user H1 speaks to the speech inputter of the wearable speech input/output apparatus 2 in the first language (in this example, the Japanese language, the same applies hereinafter), the mobile terminal 1 recognizes the speech in the first language from the user H1, and converts the speech to the text data in the first language.

In this case, the mobile terminal 1 selectively extracts the speech in the first language (that is, the sound in the Japanese language) to be a translation target, and selectively removes the speech in the other language (for example, sounds from nearby foreigners or various animals, a so-called noise sound from a vehicle or the like, and the like) (deletes the speech from a workspace such as a RAM).

Therefore, the converted text data in the first language is transmitted to the translation server 5 provided on the network 4 (for example, the Internet) from the mobile terminal 1 together with data indicating the type of second language (in this example, the Chinese language). The translation server 5 converts (translates) the text data in the first language (the Japanese language) to the text data in the second language (in this example, the Chinese language, the same applies hereinafter), on the basis of the received data, and transmits the text data in the second language as a translated article to the mobile terminal 1.

The mobile terminal 1 stores the text data in the second language (the Chinese language) received from the translation server 5 in the memory and synthesizes a speech signal of the text (a translation character string in the Chinese language), and outputs the speech of the synthesized translation character string from the speech outputter (for example, a speaker) of the mobile terminal 1. In addition, the mobile terminal 1 displays the text in the second language (the Chinese language) on the displayer at a suitable time (for example, approximately simultaneously with the speech output) according to the manipulation of the user H1 or the setting details.

According to the operation as described above, a conversation person (the other person H2 illustrated in FIG. 1) is capable of listening to and understanding contents spoken by the user H1 in the first language (the Japanese language) in the second language (the Chinese language) that is the native language.

In contrast, in a case where the other person H2 responds to the mic of the mobile terminal 1 in the second language (the Chinese language), the same operation as described above is performed, is translated to the text in the first language (the Japanese language) by the translation server 5, and then, is output from the wearable speech input/output apparatus 2 (the wireless earphone) worn on the user H1 in the speech in the first language (the Japanese language).

Therefore, according to this system, one speaker (the user H1 or the other person H2) is capable of listening to the contents spoken by the person (the other person H2 or the user H1) in the foreign language (the Chinese language or the Japanese language) in the native language (the Japanese language or the Chinese language) (further, suitably displayed in the character of the native language), and thus, is capable of immediately understanding the contents spoken by the person.

In addition, according to this system, since the processing from the input of the spoken speech (the first language or the second language) to the output of the translation speech (the second language or the first language) is automatically performed, both of the user H1 and the other person H2 are capable of listening to the translation speech without performing the switch manipulation. Accordingly, it is not necessary for the user H1 to explain to the other person H2 prior to the conversation or it is possible to make the minimal gesture or the like.

Note that, in such a set of processing pieces, the text data before translation (the pre-translation character string) may be displayed to be checkable on the screen of the mobile terminal 1.

In addition, in this system, in cooperation with the mobile terminal 1 having a speech translation function and the wearable speech input/output apparatus 2 connected to the mobile terminal 1, it is possible to improve the convenience (the usability) when speakers of different languages have a conversation by using the mobile terminal 1.

Specifically, in this system, the output path of the translation speech is automatically switched in accordance with the path of the spoken speech input to the mobile terminal 1 and the recognized language such that the user H1 mainly uses the wearable speech input/output apparatus 2 (the wireless earphone), and the other person H2 mainly listens to the translation speech through the mic and the speaker of the mobile terminal 1 (refer to FIG. 1).

By performing such processing of automatically switching the output path, it is possible to perform natural communication between the user H1 and the other person H2, and to provide a user-friendly translation system (a speech translation processing method).

In the above description, for facilitating the understanding, a case is premised in which the first language and the second language are set in advance by so-called manual work of the user 1, but as described below, such language setting may be automated or semi-automated.

For example, the mobile terminal 1 is capable of automatic setting a language initially input and recognized after the activation of the application described above (for example, the language used by the user H1, in this example, the Japanese language) to the first language, and of automatic setting a language (in the example described above, the Chinese language) initially input other than the set first language) to the second language.

Alternatively, by providing a known learning function in the application described above and by using the translation function to a certain extent, it is also possible to automatically set and automatically update a language most frequently input (in general, the language used by the user 1, in this example, the Japanese language) to the first language.

As described above, by minimizing the setting manipulation of the user H1 to be performed with respect to the application implemented in the mobile terminal 1, the usability of the speech translation processing apparatus and this system is improved as a whole.

[Configuration and Operation of Hardware of This System]

Figure 2:
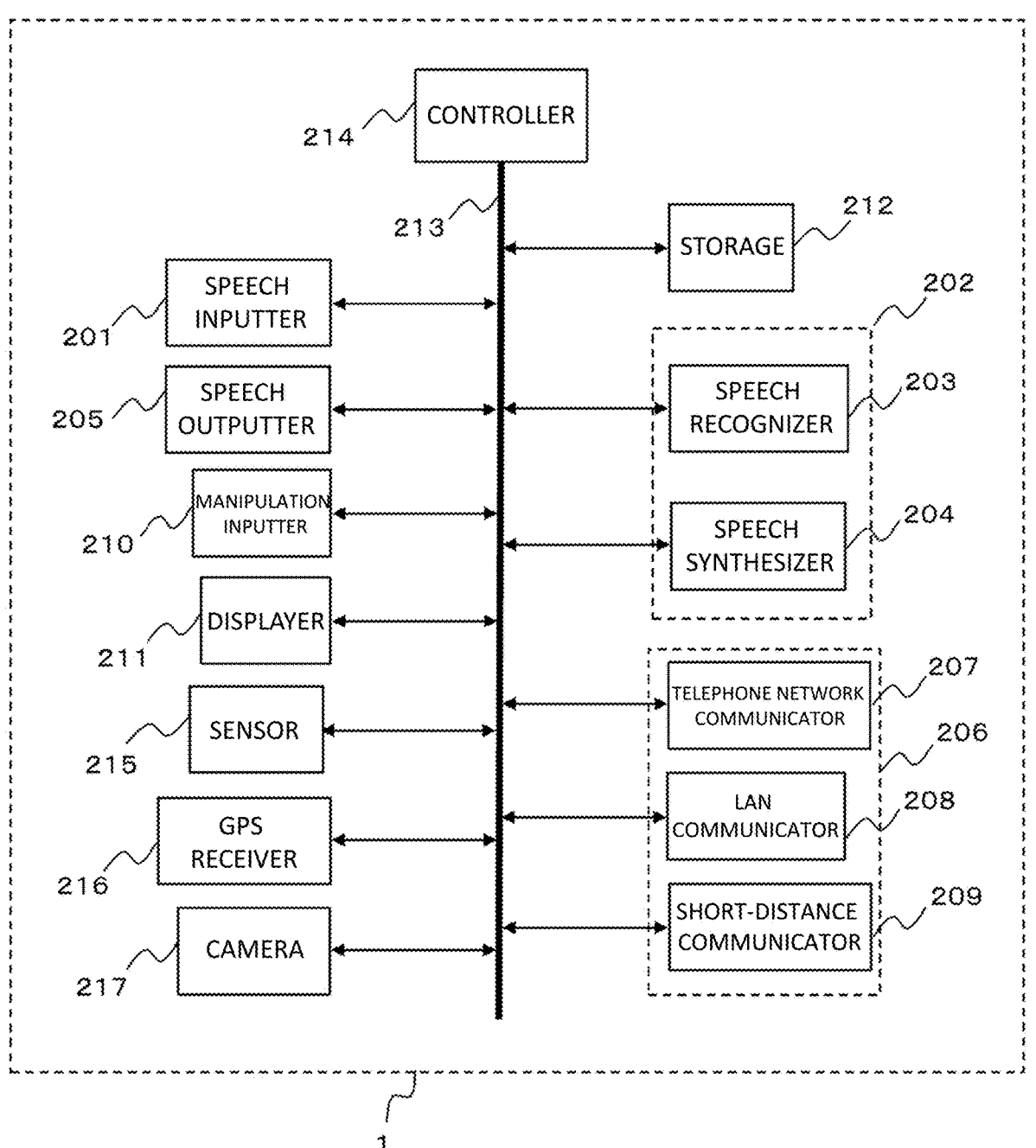
FIG. 2 is a diagram illustrating a configuration of a mobile terminal used in the speech translation system.

FIG. 2 is a block diagram illustrating the configuration of the mobile terminal 1 in each of the embodiments. Note that, the mobile terminal 1 in which the application described above is implemented corresponds to a "speech translation processing apparatus" of the present invention.

As illustrated in FIG. 2, the mobile terminal 1 includes a speech inputter 201, a speech signal processor 202, a speech outputter 205, a communicator 206, a manipulation inputter 210, a displayer 211, a storage 212, a system bus 213, a controller 214, a sensor 215, a GPS receiver 216, and a camera 217. The blocks are connected to each other through the system bus 213, and are mainly operated under the control of the controller 214.

In this example, the speech inputter 201 is a microphone (hereinafter, simply referred to as a "mic"), and has a function of collecting the sound around the mobile terminal 1 including the sound of the user. A speech input method of the speech inputter 201 may be either a single (monaural) mic or a right-left dual (stereo) mic.

In addition, a plurality of speech inputters 201 may be provided in each of the upper portion and the lower portion or on each of the front side and the back side of the mobile terminal 1. In this case, a main mic to collect the main speech, for example, is disposed in the upper portion or on the front side, and a sub-mic to collect the ambient speech, for example, is disposed in the lower portion or on the back side in order to remove the noise.

Alternatively, in a case where the mic is provided in each of the upper portion and the lower portion of the mobile terminal 1, the mic collecting the main speech may be switched in accordance with the position of the mobile terminal 1 that is detected by the sensor 215 described below.

The speech signal processor 202 includes a speech recognizer 203 and a speech synthesizer 204, and performs various speech signal processing pieces as described below, in addition to the general speech signal processing such as filtering or amplification.

The speech recognizer 203 recognizes and extracts the speech (the spoken speech) in a predetermined language from the data of the input speech (the human voice, the ambient sound, or the like), and converts the speech to the text data in the language or digital data based thereon. The language recognized by the speech recognizer 203 is a language set by the user H1 from a plurality of types of languages, or a language set automatically by a method described below.

Note that, in a case where even the language that can be recognized by the speech recognizer 203 is not set as a translation target language, only the set specific language may be recognized, or in a case where language recognition is attempted and the language can be specified, the text data in the recognized language may be generated.

In addition, in a case where the speech is input, the speech recognizer 203 is capable of extracting feature information of the sound of the speaker to be added as attribution information of the text data, in addition to the processing of recognizing the language speech (the spoken speech of the speaker) included in the input speech to generate the text data in the language (to convert the data). In this case, when the text data in the same language is converted to the speech data by the speech synthesizer 204 described below and is reproduced, there are advantages that the speech close to the voice of the speaker can be reproduced and output.

Further, by learning and accumulating the used vocabulary and the pronunciation of the user H1 with a machine learning function such as deep learning, a recognition accuracy may be improved.

In each of the embodiments, the input to the speech recognizer 203 is two types of the ambient speech of the mobile terminal 1 that is input from the speech inputter (the mic) 201, and the speech that is collected by the speech inputter 30 (refer to FIG. 3) of the wearable speech input/output apparatus 2, described below, and is input through a short-distance communicator 209. The input paths of such two types of speeches (before translation) are used by being selectively switched in accordance with an operation mode described below.

In addition, the speech recognizer 203 is capable of outputting the speech signal before being converted to the text data or the speech signal in which the recognized language speech (spoken speech) is selectively removed from the input signal as an output signal, in addition to the text data in the recognized and extracted language. A configuration of improving the usability by using such a speech signal will be described below in a fourth embodiment and a fifth embodiment (the description of FIG. 18 to FIG. 20).

With reference to FIG. 2, the communicator 206 includes a communication interface according to a plurality of communication methods, such as a telephone network communicator 207, a LAN communicator 208, and a short-distance communicator 209.

Among them, the telephone network communicator 207 is a communicator that performs a phone call or data transmission and reception through a mobile telephone communication network. In addition, the LAN communicator 208 is a communicator that is connected to the Internet through a router or the like and performs data transmission and reception with respect to various servers and other apparatuses connected to the Internet. Further, the short-distance communicator 209 is a communicator corresponding to a communication method, such as Bluetooth (Registered Trademark), and performs data communication and cooperative operation with the speech input/output apparatus 2, the wearable speech input/output apparatus 3, or other peripheral apparatuses.

In this embodiment, in order to translate the text data in the predetermined language that is generated by the speech recognizer 203 to another language, the following processing is performed under the control of the controller 214.

The mobile terminal 1 transmits the text data in the predetermined language (in this example, the Japanese language that is the first language) and a translation instruction to a designated language (here, the Chinese language that is the second language) to the translation server 5 (refer to FIG. 1) connected to the external network 4 such as the Internet, through the communicator 206 (the telephone network communicator 207 or the LAN communicator 208, the same applies hereinafter).

Subsequently, the mobile terminal 1 receives the text data translated to the designated language (the second language) from the translation server 5 through the communicator 206.

Note that, the translation instruction transmitted to the translation server 5 from the mobile terminal 1 may include not only a translation instruction to the designated predetermined language but also a reverse translation instruction for translating the text data after translation to the original language such that a translation accuracy can be checked later. In this case, the mobile terminal 1 receives both of the text data after translation and reverse translation text data from the translation server 5. Further, the mobile terminal 1 may display the reverse translation text data received from the translation server 5 on the displayer 211 together with the data before translation such that the user is capable of checking whether there is no problem in translation, or may compare both of the text data pieces by the processing in the mobile terminal 1 and may cause an alarm when a difference between both of the text data pieces exceeds a certain amount to prompt the user for check.

Note that, in this system, the translation processing is performed in the translation server 5, but as described above, a translator (a part of the function of the application described above or dedicated hardware) may be mounted in the mobile terminal 1, and the translation may be performed by the mobile terminal 1. In this case, a so-called all-in-one configuration is obtained, and off-line translation can be performed without depending on the external apparatus, and thus, the usability is improved from the viewpoint that the translation function can be used regardless of the external apparatus or the communication environment.

On the other hand, contrary to the configuration described above, the translation server 5 side may have all or a part of the speech recognition function and a speech synthesis function described below such that a load on the mobile terminal 1 side can be further reduced. Such a configuration is preferable in a case where mobile terminal 1 has a comparatively low specification, or in a case where the mobile terminal 1 is the latest type and the resource is limited by mounting other applications.

In general, the mobile terminal 1 of this system may have at least a function of inputting the spoken speech (the speech inputter 201), a function of performing cooperative operation in connection with the speech outputter 205 and the wearable speech input/output apparatus (the wireless earphone) 2 (the communicator 206 and the controller 214), the function of a translation speech acquirer acquiring the translation speech in the second language (or the first language) that is translated and generated on the basis of the spoken speech in the input first language (or the second language) (in this example, the communicator 206), and a function of performing control such that the acquired translation speech is output in an output mode according to a translation condition (a translation speech output controller).

Note that, specific control contents of the translation speech output controller (the controller 214) will be described below.

The speech synthesizer 204 converts the input (acquired) text data to the speech data in the predetermined language, on the basis of language information or the like to be added as the attribution information of the text data.

In addition, the speech synthesizer 204 may store the feature information of the sound of the user that is extracted by the speech recognizer 203 in the storage 212 such that the sound of the user can be reproduced together with the speeches before and after translation, under the control of the controller 214.

Alternatively, the feature information of the sound may be also added as the attribution information of the text data to the translation data such that the speech synthesizer 204 reproduces the sound of the speaker by using such feature information when converting the speech data.

The controller 214 determines whether to output the speech data generated by the speech synthesizer 204 from the speech outputter 205 or from the wearable speech input/output apparatus 2, and performs control such that the speech data is output in the determined path.

In this case, the controller 214 determines a suitable output path with reference to the operation mode of the mobile terminal 1, the attribution (the language type) of the speech data, the state of the wearable speech input/output apparatus 2, and the like, and performs control such that the speech data is output in the determined output path. Note that, a specific control example relevant to such determination (switch) of the output path will be described below in the description of FIG. 17.

The displayer 211 includes a liquid crystal panel in which a touch panel is embedded, an organic electro luminescence (EL), and the like, and has a function as a display having an input function. Such a displayer 211 having an input function functions as a user interface when performing various manipulations with respect to the mobile terminal 1, and displays the text data before translation that is generated by the speech recognizer 203, text data obtained by translating the same data, and various image data pieces.

The manipulation inputter 210, for example, is an icon or a switch displayed in an input screen of the touch panel described above, and functions as an inputter inputting an instruction or the like such as the activation of the speech translation function, and the setting, the change and the command of the mode of the function.

In this embodiment, a manipulation button and the like are displayed in the input screen of the displayer 211, and manipulation input is executed by manipulating the touch panel. In addition, as a configuration example of the manipulation inputter 210 other than the touch panel, a dedicated button or switch of hardware may be used.

The controller 214 is a micro processor unit controlling the entire mobile terminal 1, and outputs a control signal to each part in the mobile terminal 1. The system bus 213 connects the controller 214 and each part controlled by the controller 214, and functions a signal path for as transmitting and receiving various control signals or data.

Therefore, each part of the mobile terminal 1 is exclusively operated by transmitting and receiving the control signal output from the controller 214, but in order to avoid redundancy, in the above and the following description, it is often omitted to indicate that the controller 214 is the subject of outputting and processing the control signal.

The controller 214 includes a processor such as a CPU, a workspace such as a RAM, and a basic program and the like stored in a ROM and a ROM, and integrally controls the operation of the mobile terminal 1 by the processor executing the basic program and the like to control each operation block (refer to FIG. 2).

In addition, the controller 214 activates and executes the application having a translation function described above to cooperate the operation of the wearable speech input/output apparatus 2, the smart watch 3, and the translation server 5 while controlling each part of the mobile terminal 1.

In other words, in this system, the controller 214 activates and executes the application having a translation function described above, and thus, the mobile terminal 1 functions as the "speech translation processing apparatus" of the present invention.

In addition, in the correspondence relationship with the present invention, the controller 214 functions as the "translation speech output controller" described above. In each of the embodiments, the translation speech output controller performs control such that the translation speech generated or synthesized by the speech synthesizer 204 is output from at least one of the speech outputter 205 and the speech outputter 33 of the wearable speech input/output apparatus 2 (refer to FIG. 3) in the output mode according to the translation condition.

Here, the "translation condition" generally indicates the state of the mobile terminal 1 when performing translation, more specifically, includes the operation mode (the translation mode) of the application, a connection state of the wearable speech input/output apparatus 2 and a wearing state of the wearable speech input/output apparatus on the user H1, and the like when performing translation.

In general, examples of the main function of the translation speech output controller include the switch of the speech input/output path according to the translation mode, and the detailed operation will be described below.

In addition, the controller 214 functions as a "translation language setter" in cooperation with the displayer 211 and the like. Here, the "translation language setter" registers one language among a plurality of types of languages processible by the speech signal processor 202 as the first language (the user language) spoken by the user H1, and sets one or more languages to be a mutual translation language with the first language as the second language (the other language). Such setting may be performed by the manual work of the user H1 through the display screen of the displayer 211, or may be automatically performed by acquiring GPS position information through the GPS receiver 216, and the details will be described below.

Further, the controller 214 functions as a "switch displayer" performing switch display such that the text (the spoken character string) output from the speech recognizer 203 and the text (the translation character string) received (acquired) from the translation server 5 are sequentially displayed in either the first language (the user language) or the second language (the other language), in accordance with the instruction of the user H1.

In addition, the controller 214 performs processing of storing such texts (the spoken character string and the translation character string) and additional information thereof inside or in an external recording medium as a file, and reproducing (displaying or speech synthesizing) the stored file by reading out the accordance the file in with instruction of the user H1.

The details of each processing piece described above and the other processing executed by the controller 214 will be suitably described below.

The storage 212 is used for long-term or temporary storage of an OS, the application, or various data pieces used by the controller 214. In addition, the storage 212 can be used to store language text data generated by the speech recognizer 203, text data obtained by translating the language text data, text data additionally input by the user, text data obtained from the other external apparatus (not illustrated) connected to the Internet through the communicator 206, and the like.

Note that, the micro processor unit configuring the controller 214 may be shared as the hardware of the speech recognizer 203 or the speech synthesizer 204. In this case, a program corresponding each of to function the speech recognizer 203 or the speech synthesizer 204 is stored in the storage 212, and is suitably executed by the micro processor common to the controller 214, in accordance with the operation mode.

In general, the speech recognition function and the speech synthesis function of this embodiment may be attained as software by using the controller 214 and the common micro processor, or the speech recognizer 203 or the speech synthesizer 204 may be configured as hardware by using a dedicated processor having the same functions.

The global positioning system (GPS) receiver 216 receives GPS position information transmitted from GPS satellites. Note that, the GPS receiver 216 is capable of receiving position information transmitted from a satellite positioning system other than the GPS, or a positioning system not using the satellite. In general, the GPS receiver 216 corresponds to a "position acquirer" of the present invention, and has a function of acquiring the current position by calculating the position information of the mobile terminal 1, on the basis of the position information (in this example, the GPS position information) acquired from the positioning system described above.

The sensor 215 of the mobile terminal 1 includes a gyroscope sensor detecting the movement or the position of the mobile terminal 1, a proximity sensor detecting that the body of the user, or the like approaches, a fingerprint sensor to perform fingerprint authentication, and the like.

In one specific example, the camera 217 includes one or more cameras on both of the front side (displayer 211 side) and the back side of the mobile terminal 1. Such a camera 217 can be used when recognizing and extracting text information from a captured image, or is used as an image inputter in a case where the face of the user H1 is recognized by a face recognition function when performing authentication.

Figure 3:
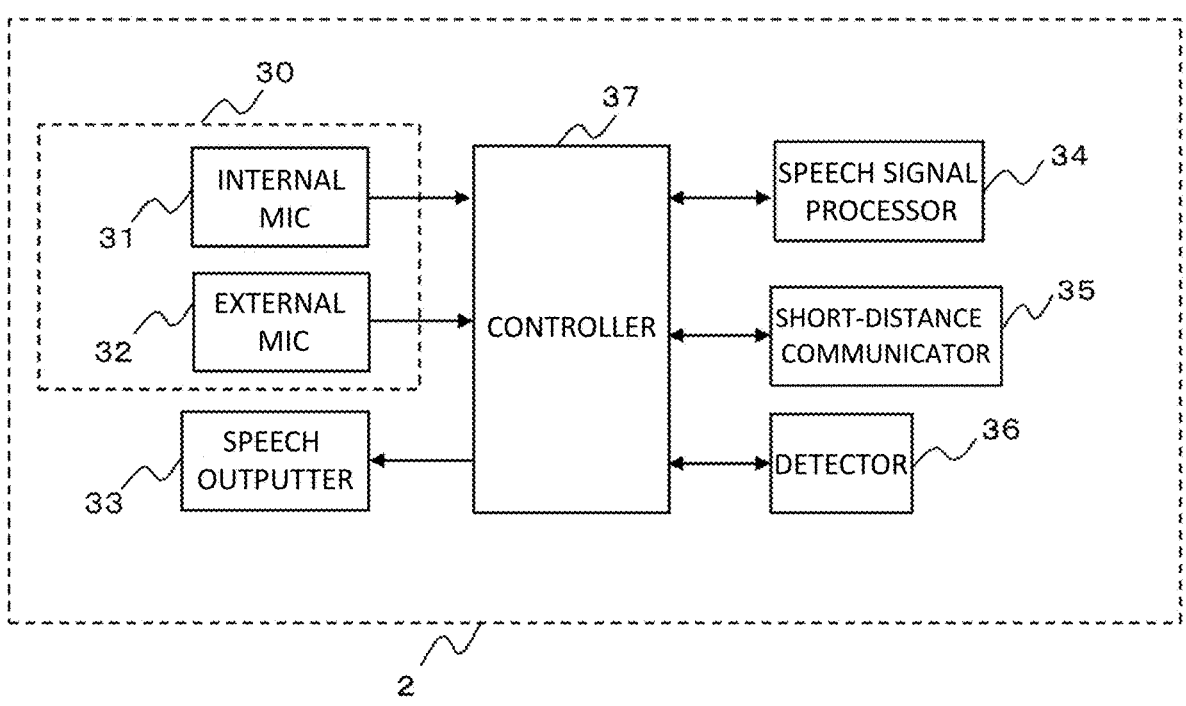
FIG. 3 is a diagram illustrating a configuration of a wearable speech input/output apparatus operated in cooperation with the mobile terminal.

FIG. 3 is a block diagram illustrating an example of the configuration of the wearable speech input/output apparatus 2 in this embodiment, and is a block configuration of one (for example, the left ear side) of a pair of right-left earphones illustrated in FIG. 1.

As described above, the wearable speech input/output apparatus 2, for example, can be various apparatuses such as a wired earphone with a mic, a wireless earphone with a mic, and a headset, and hereinafter, a configuration example of so-called fully independent right-left wireless earphones with a mic (a wireless earphone set) will be described.

As illustrated in FIG. 3, the wearable speech input/output apparatus 2 (hereinafter, also simply referred to as a "wireless earphone 2") includes a speech inputter 30, a speech outputter 33, a speech signal processor 34, a short-distance communicator 35, a detector 36, and a controller 37. As with the mobile terminal 1 described above, each part of the wireless earphone 2 described above is operated on the basis of the control signal of the controller 37, and in order to avoid complication, the description of the operation of transmitting and receiving the control signal and the processing subject will be suitably omitted.

The wireless earphone 2 includes an internal mic 31 collecting the sound inside the housing of the earphone (refer to FIG. 1), and an external mic 32 collecting the sound outside the same housing (mainly the spoken speech of the user H1), as an element of the speech inputter 30 inputting the speech.

Among them, the internal mic 31, for example, collects reverberating sound or the like inside the housing of the earphone, and supplies the collected speech signal to the speech signal processor 34, in order to perform noise cancellation processing of the speech signal processor 34.

On the other hand, the external mic 32 collects the sound (the spoken speech) of a wearer (that is, the user H1) of the wireless earphone 2 and the ambient sound (the sound of the other person, the animal, or the like, the noise sound of the vehicle, and the like), and supplies the collected speech signal to the speech signal processor 34.

The speech signal processor 34 of the wireless earphone 2 performs various speech signal processing pieces such as the amplification or the suppression of the input speech, the addition, the filtering, and the noise cancellation.

The speech outputter 33 of the wireless earphone 2, for example, includes a driver with a diaphragm for sound emission.

The short-distance communicator 35 of the wireless earphone 2 is a wireless communicator corresponding to a short-distance method, such as Bluetooth communication (Registered Trademark), and is connected to an apparatus corresponding to the same communication method to communicate with each other.

Such a wireless earphone 2 receives the translation speech data that is sent from the short-distance communicator 209 of the mobile terminal 1 by the short-distance communicator 35, and suitably performs the speech signal processing with respect to the translation speech data by the speech signal processor 34 to be output as the translation speech from the diaphragm of the received speech outputter 33. In this case, the short-distance communicator 35 also transmits and receives control information or the like that is required for the cooperative operation with the mobile terminal 1.

The detector 36, for example, includes an optical sensor or the like detecting a change in an infrared ray or the like, detects that the user H1 is wearing the wireless earphone 2 with the optical sensor, and outputs a detection result to the controller 37. Therefore, the controller 37 constantly recognizes whether the wireless earphone 2 is in the wearing state, and thus, is capable of performing control according to such a wearing/non-wearing state. Further, the controller 37 of the wireless earphone 2 transmits the detection result of the detector 36 to the mobile terminal 1 in connection with the mobile terminal 1, and thus, is capable of performing the control according to the wearing/non-wearing state of the wireless earphone 2 even on the mobile terminal 1 side.

As described above, the wireless earphone 2 is a pair of right-left earphones, and the same applies to the case of a headset.

In addition, in the wireless earphone 2, the speech signal processor 34, for example, is capable of adjusting the translation speech based on the following signal processing to output the translation speech after adjustment.

That is, the speech signal processor 34 is capable of suppressing and outputting the ambient sound as a noise when executing a noise cancellation function. In addition, the speech signal processor 34 is also capable of performing the signal processing of changing frequency characteristics, in accordance with audibility characteristics of the user H1, for example, such that a high pitch sound is easily heard or the volume is amplified.

In one specific example, in order to perform the volume adjustment of the translation speech that is output from the wireless earphone 2 or the signal processing described above, a hardware switch may be provided as an element of the speech signal processor 34.

On the other hand, the controller 37 of the wireless earphone 2 performs processing of switching on/off of various functions such as a function of importing the external speech and the noise cancellation function, in accordance with the instruction of the user H1. Note that, the controller 37 and the controller 214 of the mobile terminal 1 are operated in cooperation with each other or in synchronization with each other through wireless communication. Therefore, the on/off of the functions of the wireless earphone 2 side described above or the operation such as the volume adjustment can be executed through the input manipulation of the user H1 with respect to the mobile terminal 1.

Figure 4:
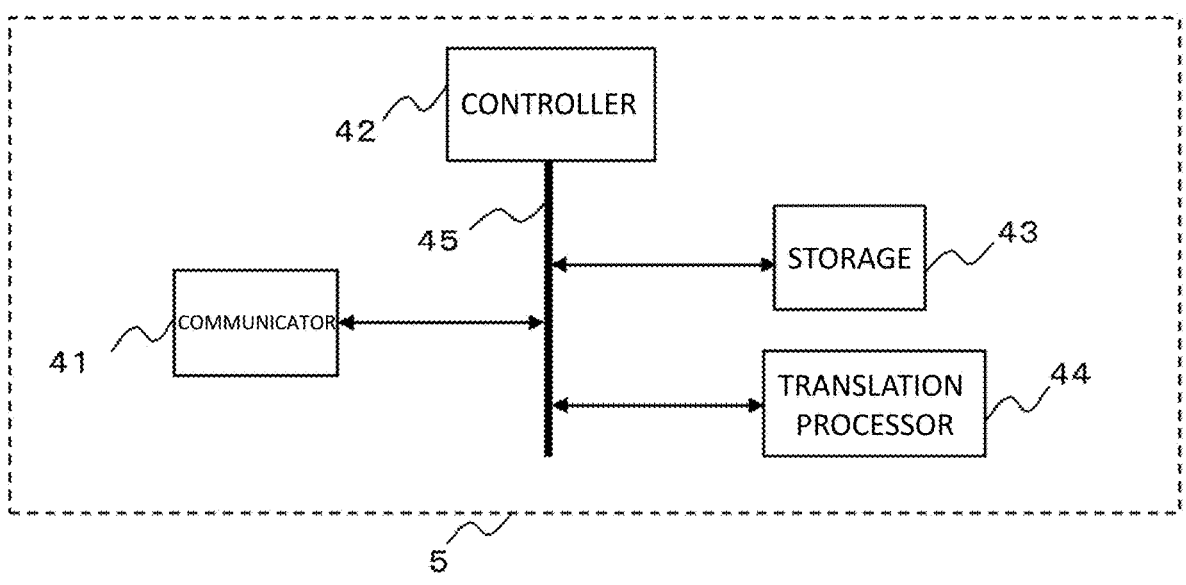
FIG. 4 is a diagram illustrating a configuration of a translation server used in the speech translation system.

FIG. 4 is a block diagram illustrating the schematic configuration of the translation server 5 that is generally described in FIG. 1. As illustrated in FIG. 4, the translation server 5 includes a communicator 41, a controller 42, a storage 43, a translation processor 44, and a system bus 45.

The communicator 41 of the translation server 5 is an interface to transmit and receive various data pieces relevant to translation such as the text data and the additional information with respect to the information terminal 1 through the network 4 (refer to FIG. 1).

The storage 43 is a storage medium such as a ROM, a RAM, and a hard disk, and stores a basic program and a translation program that are executed by the controller 42.

The controller 42, for example, is a processor unit such as a CPU or a MPU, and operates the translation processor 44 by executing the translation program stored in the storage 43.

Specifically, in a case where the text data in the predetermined language (a character string to be translated and language information of the character string) and language information to be converted are received through the communicator 41, the controller 42 of the translation server 5 passes such a set of data to the translation processor 44. Subsequently, the translation processor 44 converts the character string (for example, the text data in the first language (the Japanese language)) to text data in a language desired to be translated (for example, the Chinese language), and thus, generates the translation character string (new text data). Then, the controller 42 transmits a translation result of the translation processor 44 (in this example, text data including the translation character string in the Chinese language and language information indicating that it is the Chinese language) to an apparatus of a transmission source (in this example, the mobile terminal 1) through the communicator 41.

Note that, for each user, the controller 42 of the translation server 5, for example, stores (accumulates) a list of the text before translation, the translation text, and the like, unique or characteristic information (for example, frequently used words, paragraphs, and the like) of the user (in this example, the user H1) in the storage 43. In this case, the translation server 5 may improve the translation accuracy by performing machine learning of feeding back the stored information to user information.

[Operation Mode]

Next, the operation mode of the mobile terminal 1 in this embodiment when performing speech translation will be described. In a non-attributive specific example, a plurality of operation modes can be selected as the translation function of the mobile terminal 1. In this case, the user H is capable of performing a desired translation operation by selecting any operation mode through a mode selection screen displayed on the displayer 211.

Figure 5:
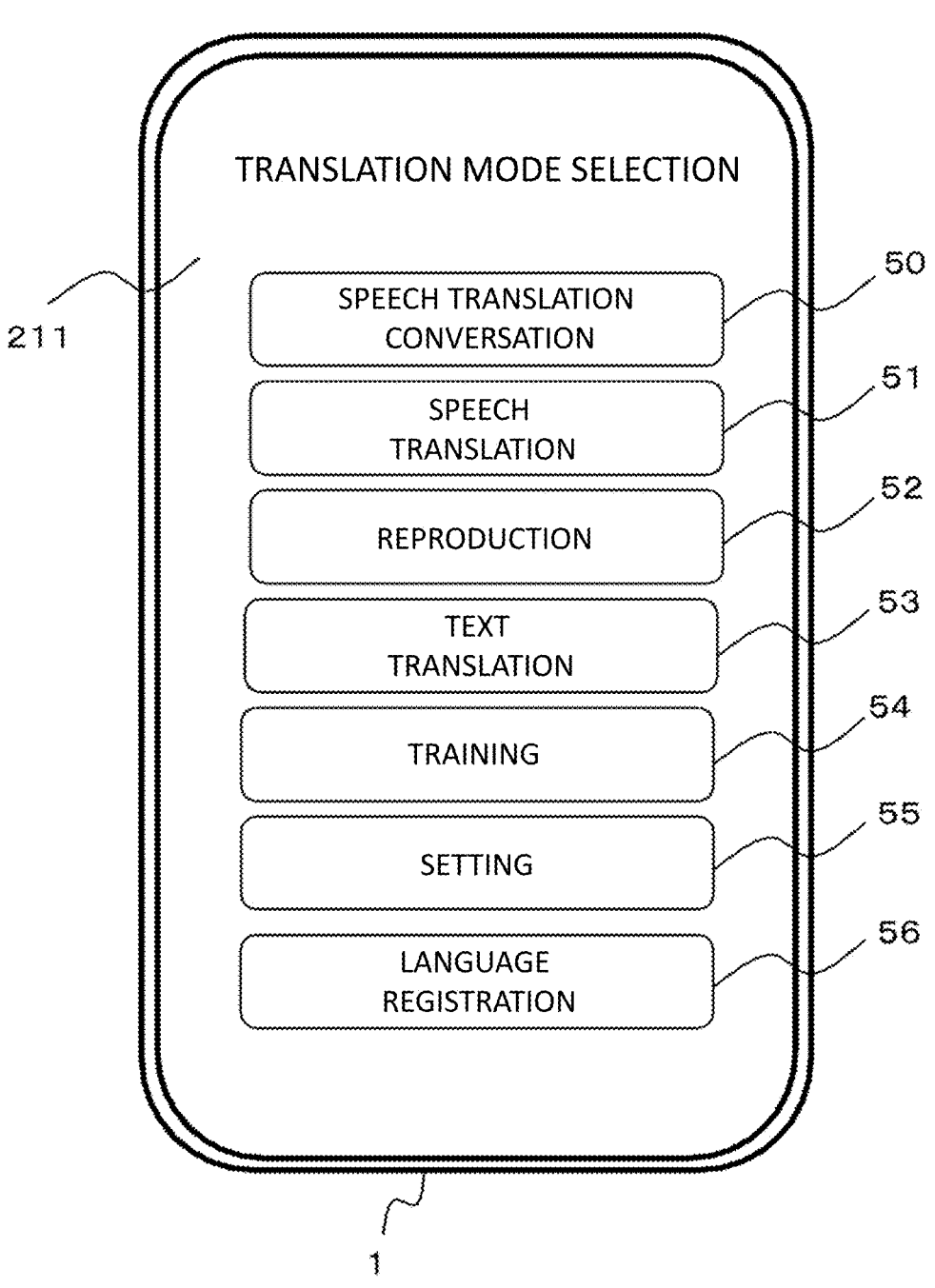
FIG. 5 is a diagram illustrating an example of mode selection screen display of the mobile terminal.

FIG. 5 is a diagram illustrating a display example of the mode selection screen of the mobile terminal 1. In this embodiment, when the translation function (the application described above) is activated, the mode selection screen illustrated in FIG. 5 is displayed on the displayer 211 of the mobile terminal 1.

In the example illustrated in FIG. 5, seven operation modes can be selected as the mode selection screen. That is, selection buttons 50 to 56 corresponding "speech translation conversation" mode, a "speech translation" mode, a "reproduction" mode, a "text translation" mode, a "training" mode, a "setting" mode, and a "language registration" mode are displayed on the mode selection screen.

Here, in a case where the user H1 touches (selects) any one desired selection button of the selection buttons 50 to 56, the controller 214 transitions to any one selected operation mode.

Among them, the speech translation conversation mode, for example, is a mode used when the owner (here, the user H1) of the mobile terminal 1, using the Japanese language as the native language, goes abroad and has a face-to-face conversation with a local person or has a face-to-face conversation with a foreigner who has visited Japan. On the other hand, the speech translation mode, for example, is a mode for translating an announcement at the airport or the foreign language heard from the surroundings on the streets abroad to the native language of the user.

In addition, the reproduction mode is a mode for reproducing the text recorded in the storage 212 when the translation operation was executed in the past or the speech of the other text data. Further, the text translation mode is a mode for outputting a text or a speech by translating text data in an arbitrary language to a desired language.

In one specific example, the controller 214 automatically generates a file name for each processing (start-end) of the speech translation, and in the processing, the text (the pre-translation character string) generated by the speech recognizer 203 and the text (the translation character string) acquired from the translation server 5 are associated with the file name and are stored (recorded) in the storage 212.

Then, in a case where the selection button 52 of "reproduction" illustrated in FIG. 5 is selected (touched) by the user, the controller 214 performs control such that a list of the file names recorded (accumulated) in the storage 212 is displayed on the displayer 211, and in a case where any one of the file names is selected (touched by the user), the text (the pre-translation character string and the translation character string) of the file are read out, and the speech signal is synthesized by the speech synthesizer 204.

In addition, the training mode is a mode in which the user inputs the speech and checks the recognition result, and in a case where there is an error, feedback is provided by correcting the error with the speech input or the text input, and the speech recognizer 203 is learned to increase a speech recognition accuracy.

According to the learning in the training mode, the pronunciation, the accent, the voice feature, the frequently used vocabulary or expression, the dialect, and the like, which are different for each user, are learned by the mobile terminal 1 (the application), and thus, the recognition accuracy when the user inputs the speech can be improved.

In addition, in the training mode, in addition to the speech recognition, the speech or the text input by the user can be translated to an arbitrary language, a reverse translation result thereof can be checked by the user, and in a case where there is a difference, feedback can be provided. By providing such a function, it is possible to increase the accuracy of various functions relevant to translation, in addition to the speech recognition. In addition, in the training mode, the mobile terminal 1 may be provided with a speech assist function to be learned by a user interface in an interactive manner with the user.

The operation modes described above are an example, and among the modes, only at least the setting mode for performing various settings, the language registration mode, the speech translation conversation mode, or modes similar thereto may be used, or a mode in which various modes described above are combined or the other operation mode can be provided, and the modes may be hierarchized.

For example, the user interface in an interactive manner, described as the function of the training mode described above, can also be incorporated the in speech translation conversation mode. In this case, in the speech recognition processing, in a case where it is determined that there is a possibility of false recognition, processing such as checking whether the recognition result is correct with the speech of the user by the speech assist function may be performed. By performing such processing, the false recognition of homonym or words and phrases s with similar pronunciation can be prevented in real time.

(Operation of Language Registration Mode)

Next, the operation of the language registration mode will be described. In the mode selection screen illustrated in FIG. 5, in a case where the selection button 56 of the language registration mode is touched (selected), the controller 214 transitions to the language registration mode.

Figure 6:
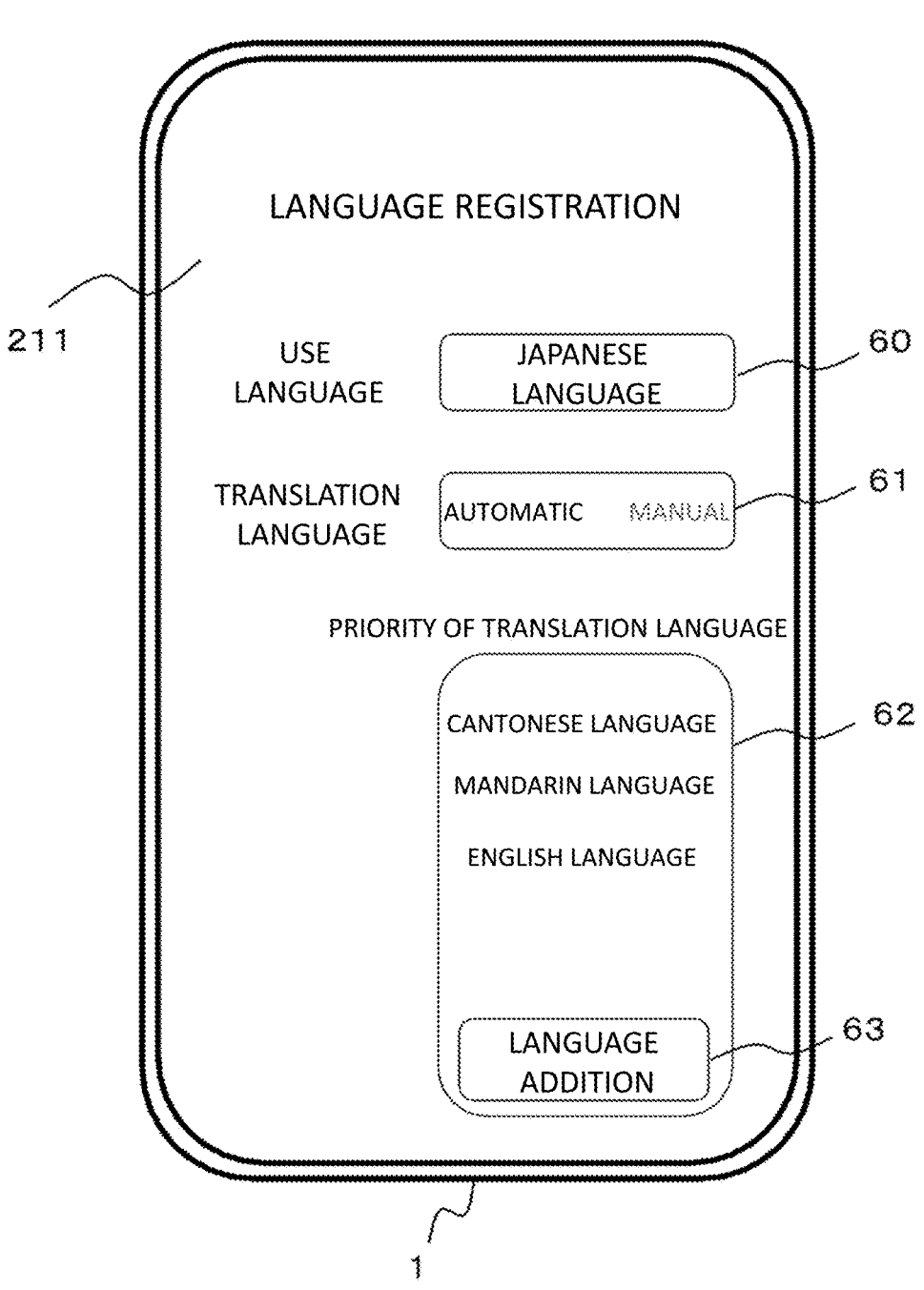
FIG. 6 is a diagram illustrating an example of screen display in a language registration mode of the mobile terminal.

FIG. 6 is a diagram illustrating an example of the display screen of the language registration mode. In such a language registration mode, a "use language" that is mainly used by the user is registered. In the example of FIG. 6, a state is illustrated in which the user registers the "Japanese language" as the use language. Note that, the "first language" of the user 1 described in FIG. 1 (further, the present invention) corresponds to the "use language" in FIG. 6.

In this embodiment, in a case where the use language is newly set, or in a case where the use language is changed, available languages are displayed as a list by touching a use language setting button 60, under the control of the controller 214. Then, the user selects (touches) a language to use among the languages displayed as a list, and thus, the selected language is registered as the "use language". Here, as the "use language" set by the user, in general, a language used by the user in everyday life, such as the native language of the user, may be set.

After the use language of the user is set, the second language (the language of a translation destination or a translation source) to be a target of the mutual translation with the set use language (that is, the first language) is set. Here, such a second language is referred to as a "translation language".

With reference to FIG. 6, either automatic setting or manual setting can be selected as a setting method of the translation language. Specifically, the user touches and selects the region of "automatic" or "manual" displayed in an automatic/manual selection button 61 to select one of the automatic setting and the manual setting.

Here, in a case where the region of "manual" in the automatic/manual selection button 61 is selected, it is possible to set a plurality of translation languages, and in such a case, it is possible to prioritize the translation languages. Specifically, in a case where the display area of the target language in the translation language display section 62 is touched (selected) by the user when performing such manual setting, as illustrated in FIG. 6, a list of the target languages that can be set (in the illustrated example, a "Cantonese language" of the Chinese language, a "Mandarin language" of the Chinese language, and an "English language") is displayed, under the control of the controller 214, and thus, the languages can be selected in order of importance, or unnecessary languages can be deleted. In this example, the target language that can be set includes languages that can be subjected to the text translation by the translation server 5 and can be subjected to the speech recognition and the speech synthesis by the mobile terminal 1 (the speech signal processor 202).

In addition, in a case where the translation language is added, and the language addition button 63 is touched (selected), languages that can be added are displayed as a list under the control of the controller 214, and the translation language to be added can be arbitrarily selected by the user.

On the other hand, in a case where the translation language is automatically set, the controller 214 acquires position information of a location in which the mobile terminal 1 is used, on the basis of GPS information, and automatically sets a language used in the area, such as an official language or the like at the position (a use location), by giving a high degree of priority.

In order to perform such processing, a list or a table (hereinafter, simply referred to as a table) in which the position information and the language used in the area are associated with each other is stored in advance in the storage 212 of the mobile terminal 1. Then, when performing the automatic setting described above, the controller 214 may acquire the GPS position information by operating GPS receiver 216, and may perform the automatic setting by extracting the corresponding language, with reference to the table in the storage 212 described above.

In one non-restrictive specific example, in a case where the region of "automatic" in the automatic/manual selection button 61 is selected when the user H1 is staying in Hong Kong, as illustrated in FIG. 6, the controller 214 automatically sets the Cantonese language, the Mandarin language of the Chinese language, and the English language as the translation language.

Note that, the mobile terminal 1 itself does not include the table in which the position information and the use language are associated with each other, and the controller 214 may access a predetermined external server or the like when there is a setting instruction from the user, and may acquire the table described above from the external server.

According to the mobile terminal 1 of this embodiment having an automatic setting function as described above, for example, even in a case where the user H1 travels abroad, and it is not possible to determine which language the person (a sales assistant of a travel destination) speaks, the translation target language is automatically set, and thus, the usability is excellent. The translation can be performed between the use language and the translation language set as described above.

Further, in a case where the translation language is desired to be manually set or added, the user H1 sets the automatic/manual switch button 61 of the translation language illustrated in FIG. 6 to "manual", and touches an arbitrary portion in the language addition button 63 that is the lower portion of the translation language display section 62. In this case, a language list is displayed under the control of the controller 214. Then, by selecting (touching) the language used by the conversation person among the languages among the displayed as a list, the selected language is set as an "additional language".

Such manual setting, for example, may be used when the translation target language is already determined such as a case where it is known in advance that the conversation person speaks in the English language.

Note that, in the above description, it is assumed that the use language is one language, but the use language may be set by prioritizing two or more languages of a main use language and a sub-use language.

In addition, in the language registration mode described above, it has been described that one or more languages are set with respect to each of two language items of the "use language" of the user H1 and the "translation language" to be a mutual translation target, the name of such a language item is arbitrary. As another example, for example, in order for all the people other than the user H1 to use the mobile terminal 1 in mutual translation, the names of the language items in the language registration screen of FIG. 6 may be displayed as a "language 1" and a "language 2" such that a plurality of language can be registered by being prioritized respectively.

(Operation of Speech Translation Conversation Mode)

Next, the operation of the speech translation conversation mode in the mobile terminal 1 will be described. The speech translation conversation mode is the representative operation mode of this embodiment, and is a mode preferably used in a case where two users speaking in different languages have a conversation.

In the translation mode selection screen illustrated in FIG. 5, described above, in a case where the user H1 touches the selection button 50 of the "speech translation conversation", the controller 214 transitions to the speech translation conversation mode.

The translation operation in the speech translation conversation mode may be started when transitioning to this mode, and for example, may be started by an arbitrary manipulation such as tapping the screen of the mobile terminal 1, arbitrary speaking, or the speaking of a keyword set in advance.

In addition, in the operation of the speech translation conversation mode, the speech recognition processing of the speech recognizer 203 described above is continuously executed. As another example, an operation mode for performing the speech recognition only in a case where a dedicated button (a hardware switch) is provided, and such a switch is turned on (for example, in a case where a press type switch is pressed, or while a rotation type ON/OFF switch is turned ON) may be provided. By limiting an operation period with the manipulation of such a dedicated button, an effect of suppressing the consumed power of the mobile terminal 1 can be obtained.

Hereinafter, a case will be described in which the user H1 who is the owner of the mobile terminal 1 travels to China, the "use language" is set to the Japanese language and the "translation language" is set to the Mandarin language of the Chinese language by the manipulation of the screen described above in FIG. 6, and a conversation with a Chinese person is performed by using the speech translation system of this embodiment.

Here, a case in which the user H1 who has entered an electrical shop in China has a conversation with a Chinese sales assistant will be described with reference to FIG. 7 and FIG. 8. Note that, in FIG. 7, the "language 1" is the Japanese language, and the "language 2" is the Mandarin language of the Chinese language. In addition, the "sales assistant" in FIG. 7 corresponds to the other person H2 in FIG. 1 described above.

Figure 7:
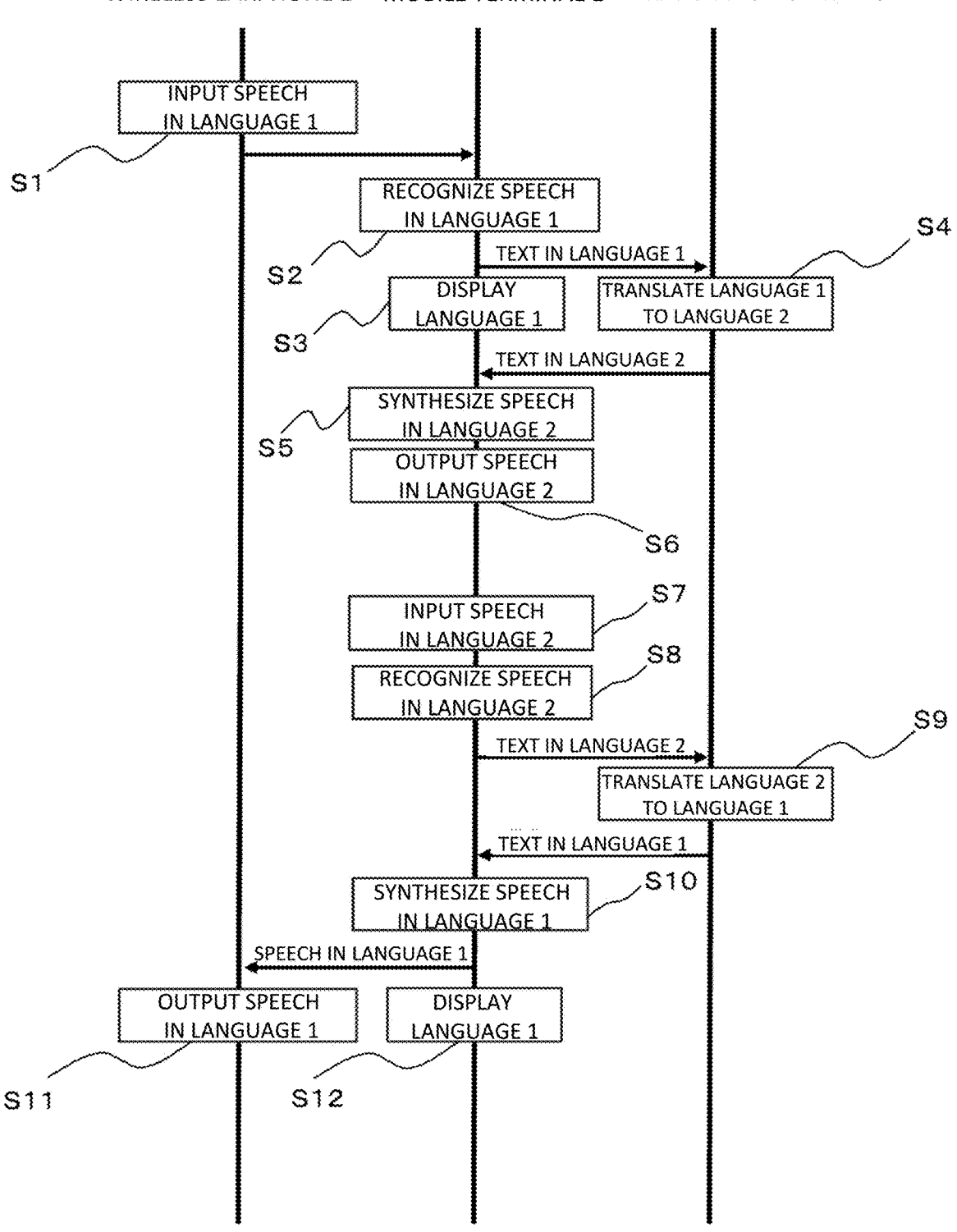
FIG. 7 is a diagram illustrating an example of an operation sequence of a speech translation conversation mode.

FIG. 7 is a diagram illustrating an example of an operation sequence of the speech translation conversation mode of the mobile terminal 1. In addition, FIG. 8 is a diagram illustrating an example of screen display of the mobile terminal 1 that is displayed for the user H1 (a Japanese language user) in the speech translation conversation mode.

In the speech translation conversation mode, the user H1 and the sales assistant have a conversation by sharing the mobile terminal 1. In this case, the user H1 has a conversation by using the wireless earphone 2 with a mic connected to the mobile terminal 1, and the sales assistant mainly has a conversation through the speech inputter 201 and the speech outputter 205 (hereinafter, also simply referred to as a "mic" and a "speaker") in the mobile terminal 1.

In FIG. 7, the sequence of the manipulation of the user H1 and the sales assistant, and the processing and data transmission and reception in each apparatus of the wireless earphone 2, the mobile terminal 1, and the translation server 5 is illustrated by steps S1 to S12.

The user H1, for example, speaks "Hello!" and input the speech from the speech inputter 30 (hereinafter, also simply referred to as a "mic") in the wireless earphone 2 (S1). The input speech is recognized as the language 1 (the Japanese language) by the speech recognizer 203 of the mobile terminal 1 (S2), and a result after being converted to the text (the character string in the Japanese language) is displayed on the screen (S3).

Figure 8:
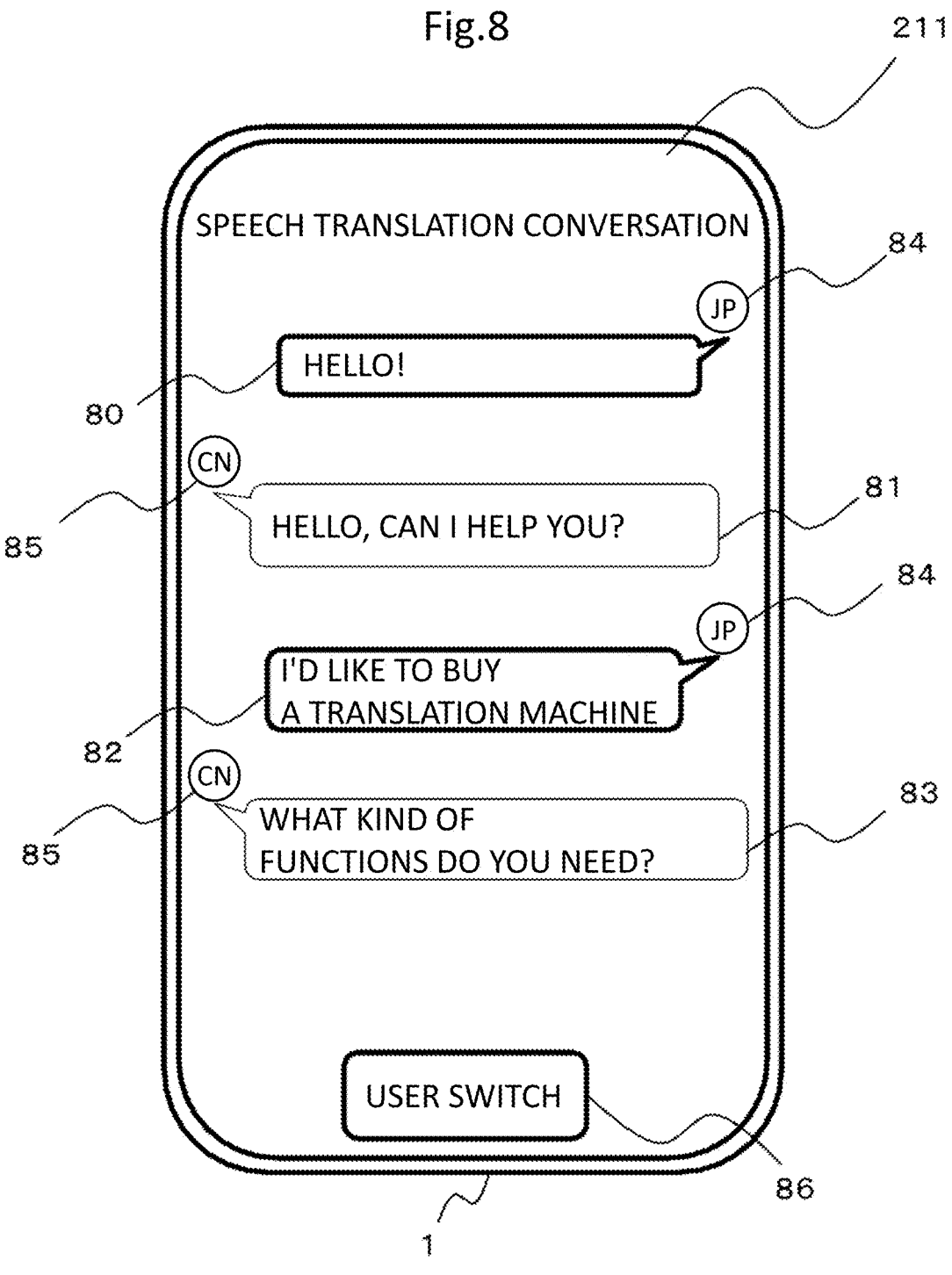
FIG. 8 is a diagram illustrating an example of screen display for a Japanese language user of the speech translation conversation mode.

In this case, the spoken contents ("Hello!") are displayed as the text in a message section 80 on the screen of the mobile terminal 1, with reference to FIG. 8.

Note that, in FIG. 8, marks represented by reference numerals 84 and 85 are language marks based on the language information, respectively, and indicate the language information (the type of spoken language) recognized by the speech recognizer 203. For example, the language mark 84 is displayed as "JP" on the screen, and indicates that the Japanese language is spoken.

Note that, in this embodiment, the language information such as the language marks 84 and 85 is displayed, but instead thereof, the user information such as a user name of the user H1 may be displayed, or both of the user information and the language information may be displayed. In addition, an apparatus from which the speech is output (in this example, the wireless earphone 2, the speaker of the mobile terminal 1, or the like) may be displayed as a character or graphic.

Returning to FIG. 7, the generated text data in the language 1 is transmitted to the translation server 5 together with translation language information (in this example, information indicating the Chinese language). After that, the text data in the language 1 is translated to the language 2 (that is, converted to the Chinese: language) by the translation server 5 (S4), and the text data in the language 2 that is the translation result is transmitted to the mobile terminal.

Note that, here, the translation is performed by the translation server 5, but as described above, the translation function (a text conversion function) may be provided in the mobile terminal 1 such that off-line translation can be performed.

Subsequently, the translation text data in the language 2 that is received by the mobile terminal 1 is synthesized by the speech synthesizer 204 (S5), and the speech in the language 2, for example, is output as "Nihao" from the speech outputter 205 (the speaker) of the mobile terminal 1 (S6). Therefore, the Chinese sales assistant knows that the user H1 has said hello.

Note that, in this case, the translation speech in the Chinese language to be output is a speech that is not required to be translated (retranslated) to the Japanese language in the mobile terminal 1. Accordingly, the controller 214 controls the speech signal processor 202 such that the speech in the Chinese language of such a portion is selectively removed from the speeches input from the speech inputter 201 (the mic) of the mobile terminal 1.

Since such a speech signal in the Chinese language is a signal generated and output in the mobile terminal 1 (the speech synthesizer 204), the speech signal processor 202 is capable of easily removing the portion of the translation speech in the input signal by subtracting the portion, in accordance with the level of the input signal.

According to this embodiment of performing such processing, even in a case where the sales assistant speaks while the translation speech is output, the speech recognizer 203 is capable of recognizing only the speech of the sales assistant.

Note that, as another method, the recognition of the input speech and the conversion to the text may be temporarily stopped during an output period of the translation speech. Here, for example, in a case where the sales assistant speaks while the translation speech is output, the speech (the speech input) of the sales assistant becomes invalid (not to be a translation target).

Subsequently, the speech in the language 2 by the sales assistant is input from the speech inputter 201 (the mic) of the mobile terminal 1 (S7). The input speech data is recognized as the language 2 (the Chinese language) by the speech recognizer 203, and is converted to the text data in the Chinese language (S8).

Such text data in the language 2 (the Chinese language) is transmitted to the translation server 5 from the mobile terminal 1, is translated to the language 1 (the Japanese language) in the translation server 5 (S9), and then, is transmitted to the mobile terminal 1 from the translation server 5.

Subsequently, the controller 214 of the mobile terminal 1 synthesizes the text in the language 1 that is received from the translation server 5 by the speech synthesizer 204 (S10), and outputs the text to the wearable speech input/output apparatus (the wireless earphone) 2 worn on the user 1. In this case, for example, the speech of "Hello, can I help you?" is output in the Japanese language from the wireless earphone 2 (S11).

In addition, the controller 214 of the mobile terminal 1 controls the displayer 211 such that the translation character string in the language 1 is displayed as the text on the display screen (S12). In this case, the same spoken contents "Hello, can I help you?" as the speech output described above are displayed as a text in a message section 81 on the screen of the mobile terminal 1 illustrated in FIG. 8.

In addition, the language mark 85 next to the message section 81 is displayed as "CN", and indicates that the Chinese language is spoken. By performing such processing, a conversation between the Japanese user H1 and the Chinese sales assistant is established.

FIG. 8 illustrates a case where the Japanese user H1 subsequently speaks about an interest in purchasing a translation machine, the speech is output in the Chinese language by this speech translation system (refer to S1 to S6 in FIG. 7), and the Chinese sales assistant who has listened to the speech asks the user 1 about the function of the translation machine desired to be purchased.

In this case, in response to the speech of the user H1, "I'd like to buy a translation machine" is displayed in the Japanese language in a message section 82 of the displayer 211 of the mobile terminal 1 by the same processing as described above (S1 to S3), and the speech in the Chinese language based on the translation result of the translation server 5 is output from the speech outputter 205 (the speaker) (S4 to S6). Therefore, the Chinese sales assistant knows the type of product that the user H1 desires to purchase.

Then, in response to the subsequent speech in the Chinese language by the sales assistant, the speech in the Japanese language "What kind of functions do you need?" by the translation server 5 based on the translation result (the text in the Japanese language) is output to the wireless earphone 2 by the same processing as described above (S7 to S11), and the same text is displayed in a message section 83 of the displayer 211 of the mobile terminal 1 (S12). Therefore, the Japanese user H1 is capable of easily understanding the asking contents in the Chinese language spoken by the sales assistant through both of auditory sensation and visual sensation.

After that, the mobile terminal 1 is capable of supporting a conversation between the Japanese user H1 and the Chinese sales assistant by performing the same processing as described above is, the speech input, the speech recognition, the text generation, the language translation, the speech synthesis and output, the display of the translation text, and the like).

In addition, in a case where the user H1 and the sales assistant have a conversation subsequent to the contents illustrated in FIG. 8, the mobile terminal 1 performs the following processing. That is, every time when the display of a new message section or the like is added to the display screen, the controller 214 of the mobile terminal 1 controls the displayer 211 such that the message section and the like (in this example, the message section 80 and the language mark 84) of the old contents are sequentially deleted. In addition, the controller 214 stores the data in the storage 212 such that the deleted contents (the message section 80 and the like) can be displayed again later (for example, such that scroll display according to a drag manipulation of the user H1 can be performed).

Note that, in FIG. 8, a usage condition is assumed in which the Japanese user H1 puts the terminal closer to the Chinese sales assistant while viewing the screen of the mobile terminal 1 such that the Chinese sales assistant listens to the translation speech in the Chinese language and is prompted to speak, and thus, a display mode of the displayer 211 of the mobile terminal 1 is Japanese language display.

Further, in this embodiment, in a case where the user switch button 86 illustrated in FIG. 8 is touched, the display of the displayer 211 can be switched to the language 2 (the Chinese language), under the control of the controller 214. Here, an example of a Chinese language display screen corresponding to the screen display for the Japanese language user of the speech translation conversation mode illustrated in FIG. 8 is illustrated in FIG. 9.

Such screen switch is effective in a case where the user H1 desires to show the screen of the Chinese language display to the sales assistant, for example, a case where the sales assistant is not capable of completely hearing the speech from the user H1 (the Chinese language output from the speaker of the mobile terminal 1) due to the ambient noise or the like or a case where the conversation becomes longer. The Chinese sales assistant who has seen the Chinese language display screen as illustrated in FIG. 9 is capable of easily visually understanding the Japanese language contents from the user H1 or the flow of the conversation contents.

Since the mobile terminal 1 generates the text data in the language 2 (the Chinese language) by the speech recognizer 203 (S8), or acquires the text data from the translation server 5 (S4), such screen switch control to the language 2 according to the user manipulation can be easily performed.

Figure 9:
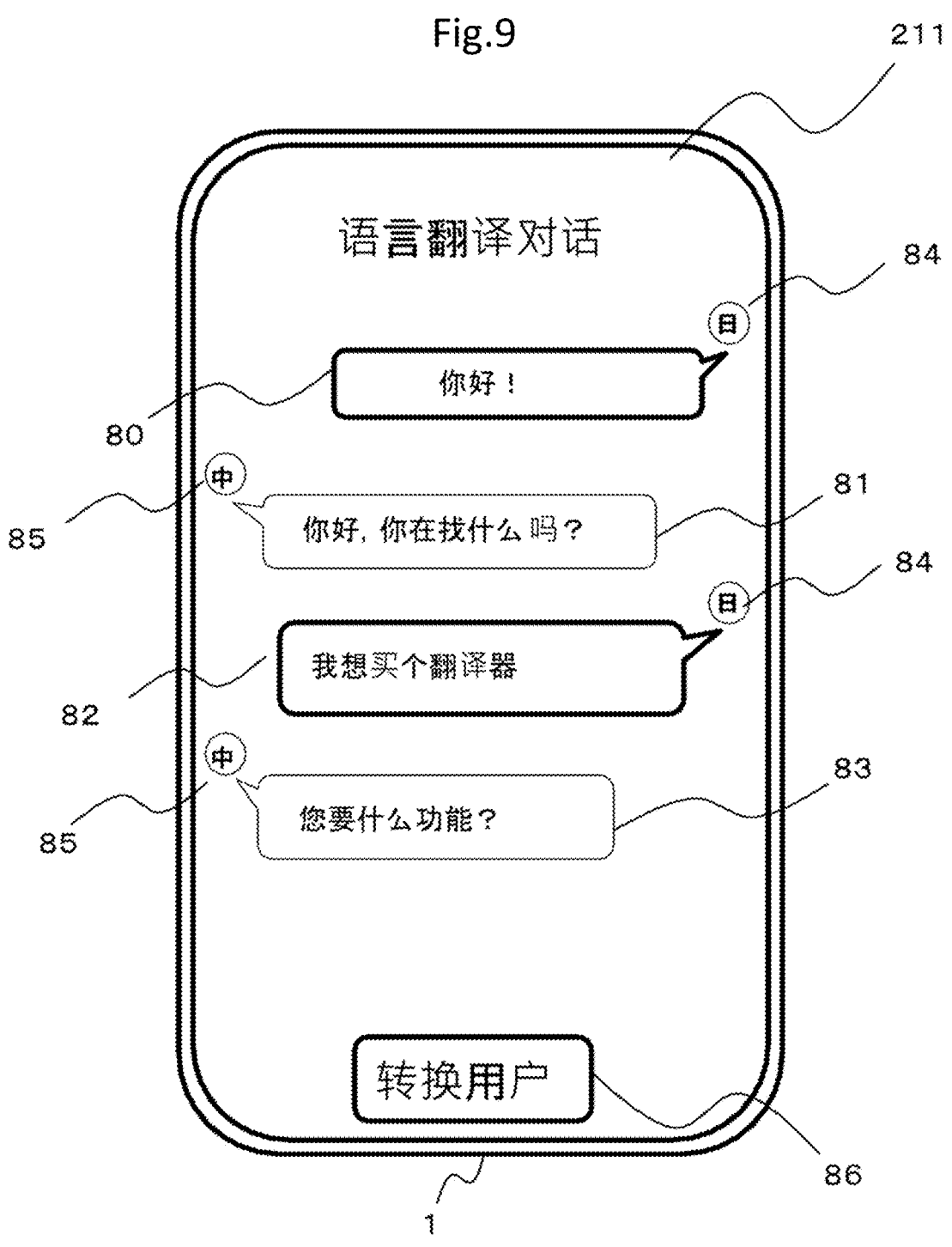
FIG. 9 is a diagram illustrating an example of screen display for a Chinese language user of the speech translation conversation mode.

Note that, since the display screen illustrated in FIG. 9 is the same as that in FIG. 8 except that the Japanese language display is set to the Chinese language display, the same reference numerals are applied to the corresponding parts, and the detailed description of such parts is omitted.

In addition, in the example illustrated in FIG. 8 and FIG. 9, the display mode of the displayer 211 of the mobile terminal 1 is switched to the display of two screens corresponding to the language 1 and the language 2, in other words, only the text in either the language 1 or the language 2 is displayed. As another example that is not illustrated, the texts in both of the language 1 and the corresponding language 2 may be displayed in parallel in the screen of the displayer 211. In the case of such a display mode, both of the user H1 and the sales assistant are capable of easily understanding the foreign language contents from the person through both of the auditory sensation and the visual sensation.

Note that, for conciseness, in the case described above, the description is premised on the fact that the use language or the translation language is a single language. In contrast, in actuality, one or both of the user H1 and the sales assistant (the speaker) are capable of using a plurality of languages.

Therefore, in a case where a plurality of languages are registered as the use language, or in a case where a plurality of languages are set as the translation language, as described below, the plurality of languages, for example, may be registered (set in advance) for one speaker (in the following example, H1 or the sales assistant) by being prioritized as with the "main language" and the "sub-language".

In an example, in translation to the use language, the translation is performed to the set "main use language", and in translation to the translation language, the translation is performed to the set translation language with the "highest priority" (for example, a language that is conceivable from the GPS information or the like as the language actually used by the sales assistant, for example, the English language).

As a specific case, for example, a case is considered in which the user H1 sets the Japanese language as the "main use language", sets the English language as the "sub-use language", sets the English language as the translation language, and the sales assistant actually has a conversation by using the English language.

In this case, the controller 214 controls each part such that for the user H1 using the wireless earphone 2, the translation speech to the Japanese language from the English language spoken by the sales assistant is output to the wireless earphone 2.

On the other hand, the controller 214 controls each part such that for the sales assistant, the speech in the English language that is spoken by the user H1 to the wireless earphone 2 is not translated and is output from the speaker of the mobile terminal 1 in the English language as the input speech, and the speech in the Japanese language that is spoken by the user 1 to the wireless earphone 2 is translated to the English language and is output from the speaker of the mobile terminal 1.

In addition, regardless of the presence or absence of setting (or the presence or absence of the input path), the controller 214 controls each part such that the Japanese language is output as it is to the wireless earphone 2 in a case where the sales assistant speaks in the Japanese language, and the mobile terminal 1 recognizes the speech as the Japanese language.

In this case, the screen display illustrated in FIG. 8 or FIG. 9 may be text display in which the spoken character strings of the plurality of languages such as the English language and the Japanese language are arranged on one screen.

In addition, as a function relevant to the screen display, the controller 214 may compare the text before translation with the reverse translation text, and when a difference exceeds a certain amount, may perform processing (display control) of warning that there is a possibility of erroneous translation by arbitrary display or speech, for example, blinking the display section of the corresponding speaking or displaying "?" next to the speaking section.

For example, in a case where a message section 84 is touched in the display state illustrated in FIG. 9, the reverse translation result (the character string in the Japanese language) may be displayed such that it is possible to check whether the speaking contents of the user H1 oneself are correctly translated to the Chinese language. Accordingly, in a case where there is a possibility of the erroneous translation or the like, the user H1 is capable of providing a countermeasure such as rephrasing.

In addition, in a case where the displayed message section (for example, the message section 84 in FIG. 9) is tapped, the translation speech may be output again from the mobile terminal such that the sales assistant is capable of listening again to the same speech, under the control of the controller 214.

In the operation of the speech translation conversation mode described above, a specific method for switching the speech input/output paths will be described.

In the speech translation conversation mode, in a case where the connection of the wireless earphone 2 to the mobile terminal 1 is detected, the controller 214 of the mobile terminal 1 checks or recognizes a setting state of the "use language" and the "translation language".

Here, as described above, it is premised that the user H1 has a conversation through the wireless earphone 2 by using the "use language" set in advance, and the sales assistant using the "translation language" mainly has a conversation by using the speech inputter/outputter 201 (the mic) of the mobile terminal 1.

Then, as described above, the controller 214 of the mobile terminal 1 performs control such that the speech spoken by the sales assistant that is input from the mic of the mobile terminal 1 is recognized (the text is generated on the basis of specifying the language type) and is transmitted to the translation server 5, and the text in the translation result (the Japanese language) that is received from the translation server 5 is synthesized to the speech and is output to the wireless earphone 2.

In addition, the controller 214 performs control such that the translation speech to the translation language from the use language (for example, the speech in the Chinese language) is output from the speech outputter 201 of the mobile terminal 1.

As described above, the controller 214 performs control such that the speech input/output paths are switched in accordance with the setting contents or the like, and in this case, the speech output from the wireless earphone 2 is limited to the speech in the use language set in advance. By performing such processing, it is possible for one user H1 to have a conversation in the use language and for the other person (for example, the sales assistant) to have a conversation in the translation language.

That is, the controller 214 determines and switches the output destination of the speech such that the speech in the use language is output to the wireless earphone 2, and the speech in the translation language is output to the speaker of the mobile terminal 1, on the basis of the set use language and translation language (the type or attribution of the language).

Alternatively, the controller 214 may specify a person (the user H1) who inputs the speech from the mic of the wireless earphone 2 from the input speech by detecting at least one of the language, the feature of the voice, the volume, and the like, in accordance with the recognition result of the speech recognizer 203, and may output the translation speech based on the input speech of the user H1 to the speaker of the mobile terminal 1.

Further, the controller 214 may switch the speech input/output paths by recognizing whether the speaker uses the wireless earphone 2 or uses the mobile terminal 1 through the speech recognizer 203.

Note that, the controller 214 may utilize a face authentication function as described below such that the operation of switching the speech input/output path described above is performed after checking that the user H1 is a user who actually sets the use language and uses the same language.

That is, in a case where the user H1 who has been subjected to user registration by the face authentication, for example, activates the translation mode (the application) after performing user recognition processing according to the face authentication, the controller 214 recognizes that a person currently using the mobile terminal 1 is the user H1.

Further, the mobile terminal 1 may be provided with a function of recognizing the voice of the user H1, and only the language speech that can be recognized by the voice of the user H1 may be set to a translation target. Accordingly, for example, it is possible to prevent an erroneous operation in a case where a person other than the owner (the user H1) uses the mobile terminal 1 and to prevent (inhibit) the person other than the owner to use the translation function.

Note that, in this embodiment, in the case of a method in which the speaking of the sales assistant is collected from the mic in the upper portion of the mobile terminal 1 by the user H1 putting the upper portion of the mobile terminal 1 close to the mouth of the sales assistant to speak while viewing the screen of the displayer 211 (refer to FIG. 8), it is possible to expect that the acoustic quality of the input speech is improved.

On the contrary, in a case where the user desires to show a text screen in the translation language (refer to FIG. 9) to the sales assistant or the like (the conversation person), the mic in the lower portion of the mobile terminal 1 is used for inputting the main speech, and in the case of a method in which the speaking of the sales assistant is collected from the mic in the lower portion, the acoustic quality of the input speech is improved.

In consideration of the above description, the controller 214 may detect the position of the mobile terminal 1 through the sensor 215 (for example, the gyroscope sensor) of the mobile terminal 1 described above, and may switch a display direction of the screen and the mic for inputting the main speech to be used (the upper mic and the lower mic) in cooperation.

Alternatively, in a case where the language displayed on the screen of the mobile terminal 1 is the use language (refer to FIG. 8), the controller 214 may set the mic in the upper portion of the mobile terminal 1 to a main mic for speech input, and in a case where the language displayed on the screen is the translation language (refer to FIG. 9), the controller 214 may switch the mic in the lower portion to the main mic for speech input.

Note that, for the speech input, signal processing of recognizing both of the use language and the translation language with the speech recognizer 203 by using the speech input from both of the mic of the wireless earphone 2 and the speech inputter 201 of the mobile terminal 1 may be performed, in order to improve the recognition accuracy.

On the other hand, for the speech output, only the speech in the use language is output from the speech outputter 33 of the wireless earphone 2, and only the speech in the translation language is output from the speech outputter 204 of the mobile terminal 1, and thus, user-friendly communication can be attained.

Note that, in the speech input, in a case where the speaking point of the first language of the user H1 (refer to S1 of FIG. 7) and the speaking point of the second language of the other person (refer to S7 of FIG. 7) overlap with each other, the speech data may be buffer once to sequentially perform the speech recognition processing, or to perform processing in parallel, in accordance with the capability of the speech signal processor 202.

As described above, in this embodiment, the output paths (and sound generation locations) of the use language and the translation language are switched to be different, and thus, the controller 214 may perform processing of simultaneously outputting the speeches in both of the languages. Alternatively, the controller 214, for example, may perform control such that the speeches in both of the languages, which timely overlap with each other, are sequentially output (for example, a speech with a late start point is buffered once and is output belatedly), on the basis of the pre-setting or the user, an input instruction in use, or the like, in accordance with a speaking start point, a speaking volume, or the like.

Further, in the above description, it is premised that the wireless earphone 2 is connected to the mobile terminal 1 and is worn on the user H1. In contrast, in a case where the wireless earphone 2 is not worn on the user H1 or is not connected to the mobile terminal 1, the controller 214 performs control such that both of the user H1 and the sales assistant input the speech from the mic of the mobile terminal 1, and the translation speech in either the language

1 or the language 2 is also sequentially output from the speaker of the mobile terminal 1 in order of speaking.

By performing such control, for example, even in a case where the wireless earphone 2 is accidentally detached from the ear of the user H1 or a case where the connection with the mobile terminal 1 is released, it is possible to continue the conversation without performing any switch manipulation.

In addition, in a case where a language set as the translation language is not capable of being recognized by the speech recognizer 203, the controller 214 performs processing in which a message such as "Translation is not available" is output from the speaker of the mobile terminal 1, and is notified to the user 1 by a sound or is displayed on the displayer 211 by a text.

Alternatively, in a case where the language set as the translation language is not capable of being recognized by the speech recognizer 203, the controller 214 may perform processing in which the recognition of languages other than the language set as the translation language is attempted, and as a result of such an attempt, in a case where it is possible to recognize that the language is the other language, translation in the recognized language is executed, and a message to that effect is output by a sound or a text.

(Operation of Speech Translation Mode)

Next, the operation of the speech translation mode in the mobile terminal 1 will be described. The speech translation mode, for example, is a mode in which an announcement, a conversation in the local language that is heard, or the like in the shopping mall, the airport or the airplane, the train station, and the street abroad can be translated to the own use language registered in the language registration mode described above, and can be viewed. Hereinafter, an in-flight announcement of the airplane will be described as an example.

Figure 10:
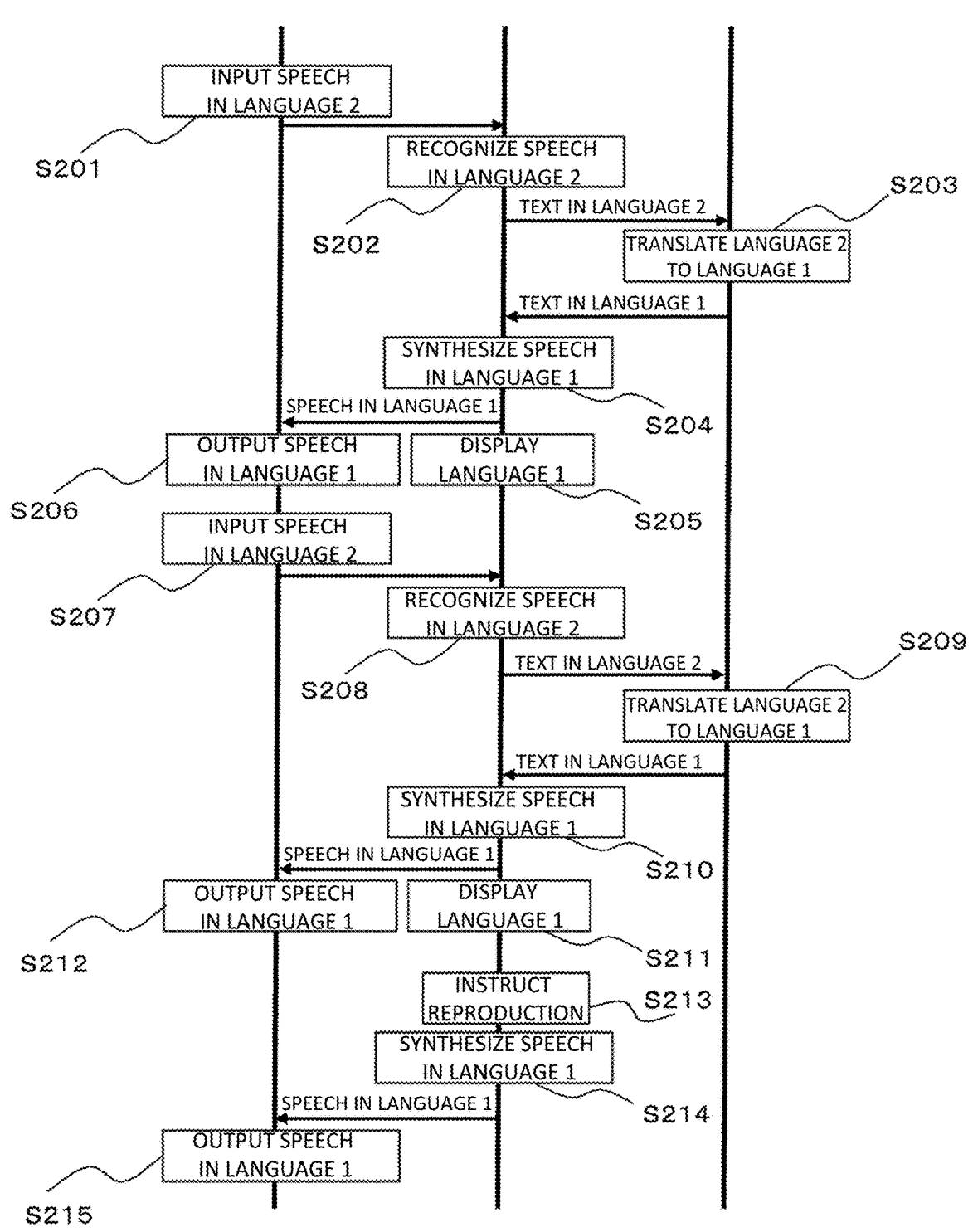
FIG. 10 is a diagram illustrating an example of an operation sequence of a speech translation mode.

FIG. 10 is a diagram illustrating an example of an operation sequence in the speech translation mode of the mobile terminal 1. In an example (a setting example by default or by the user H1, the same applies hereinafter), a speech such as an announcement in the speech translation mode is input (collected) from an external mic of the wireless earphone 2 used by the user. Note that, as another example, the speech in the speech translation mode described above may be input (collected) from the mic of the mobile terminal 1.

Accordingly, the mobile terminal 1 may be provided with a function (for example, the display of a setting screen) of setting which mic the user H1 uses to input (collect) the speech in the speech translation mode. Further, the speech input of both of the mics may be used in the speech translation mode, and in this case, the controller 214 performs noise reduction processing based on a difference in speech signals simultaneously input from two mics, or the like, and thus, is capable of improving a determination (recognition) accuracy of the input speech.

For conciseness, hereinafter, an operation sequence of the speech translation mode in the case of using the input only from the external mic of the wireless earphone 2 that is used by the user H1 will be described.

The user H1 wears the wireless earphone 2 connected to the mobile terminal 1 on the ear, and activates the speech translation mode of the mobile terminal 1.

Subsequently, the ambient speech is input from the mic of the wireless earphone 2 (S201), and in a case where such a speech is input to the mobile terminal 1, the controller 214 performs control such that the language 2 recognized or set as the translation language is recognized through the speech recognition processing of the speech recognizer 203 (S202), is converted to the text data, and is transmitted to the translation server 5 together with the translation language information.

The translation server 5 translates the received text data to the language 1 (in this example, the Japanese language) set as the use language (S203), and transmits the translation data (the text data in the language 1) to the mobile terminal 1.

The controller 214 of the mobile terminal 1 performs processing of converting the text data (the character string) received from the translation server 5 to the speech data by speech synthesis processing of the speech synthesizer 204 (S204), and displaying the character string on the displayer 211 (S205) and outputting the speech from the wireless earphone 2 (S206).

Note that, since the operation from steps S207 to S211 in FIG. 10 is the same as the operation of steps S201 to S206 described above, the description is omitted.

Figure 11:
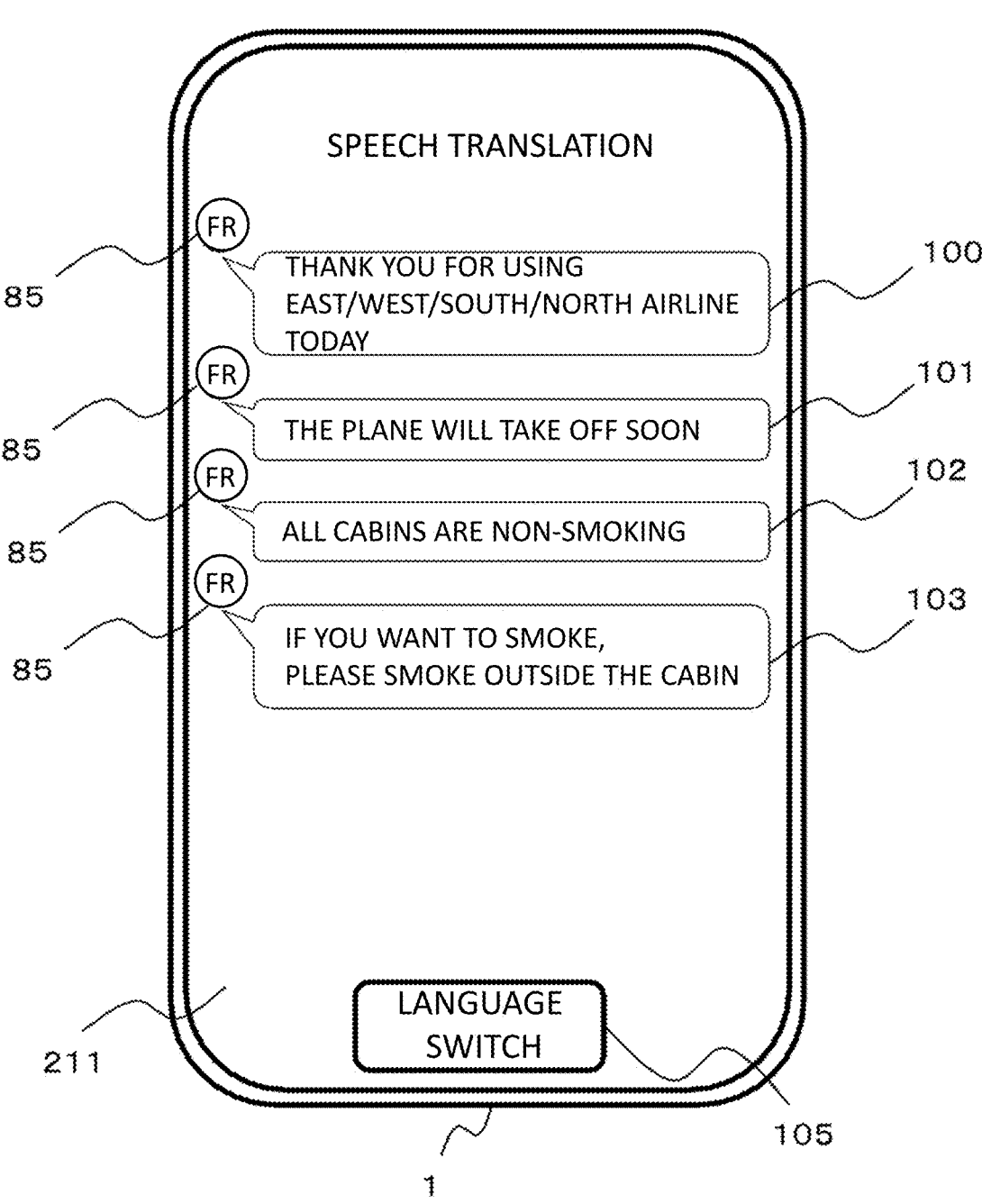
FIG. 11 is a diagram illustrating an example of screen display for a Japanese language user in the speech translation mode.

In the operation described above, an example of the screen displayed on the displayer 211 of the mobile terminal 1 is illustrated in FIG. 11.

With reference to FIG. 11, the speech of the in-flight announcement that is input from the mic of the wireless earphone 2 is sequentially displayed in message sections 100 to 103 in the display screen of the mobile terminal 1 by a text through processing such as the speech recognition (the text generation) and the translation to the language 1 (the Japanese language) as described above.

In addition, as can be seen from the comparison with the case of the speech translation conversation mode described above (FIG. 8 and FIG. 9), the language mark 85 is displayed next to each of the message sections 100 to 103 even on the display screen of the speech translation mode. In the example illustrated in FIG. 11, "FR" is displayed in the language mark 85, and indicates that the input original language is a French language.

Further, in such a speech translation mode, in a case where any one of the message sections 100 to 103 to be displayed is selected (tapped), the controller 214 performs processing of determining that a speech reproduction instruction is input (refer to S213 of FIG. 10), synthesizing the text to the speech by the speech synthesizer 204 (S214), and outputting the speech to the wireless earphone 2 (S215).

In addition, in a case where a language switch button 105 in FIG. 11 is selected (tapped), the controller 214 performs processing of switching the display screen to the translation language (in this example, the French language) to be displayed on the displayer 211. In this case, as with the case of the display screen of the use language, the controller 214 may perform processing of generating the speech in the translation language by the speech synthesizer 204, and reproducing the speech from the wireless earphone 2. As described above, in a case where the speech in the translation language is output from the wireless earphone 2, there is an effect that such a case can be used in foreign language learning.

Note that, in the above description, the speech output is set to be output to the wireless earphone 2, but the wireless earphone 2 may be detached and the speech may be output from the speaker of the mobile terminal 1, and in this case, processing of inputting the speech from the mic of the mobile terminal 1 may be performed, as with the case of the speech translation conversation mode described above.

Second Embodiment

Next, the second embodiment of the present invention will be described. In this embodiment, the user H1 also uses the smart watch 3 worn on the wrist, in addition to the mobile terminal 1 and the wireless earphone 2, and the other configuration is the same as described above in FIG. 1 and the like.

Figure 12:
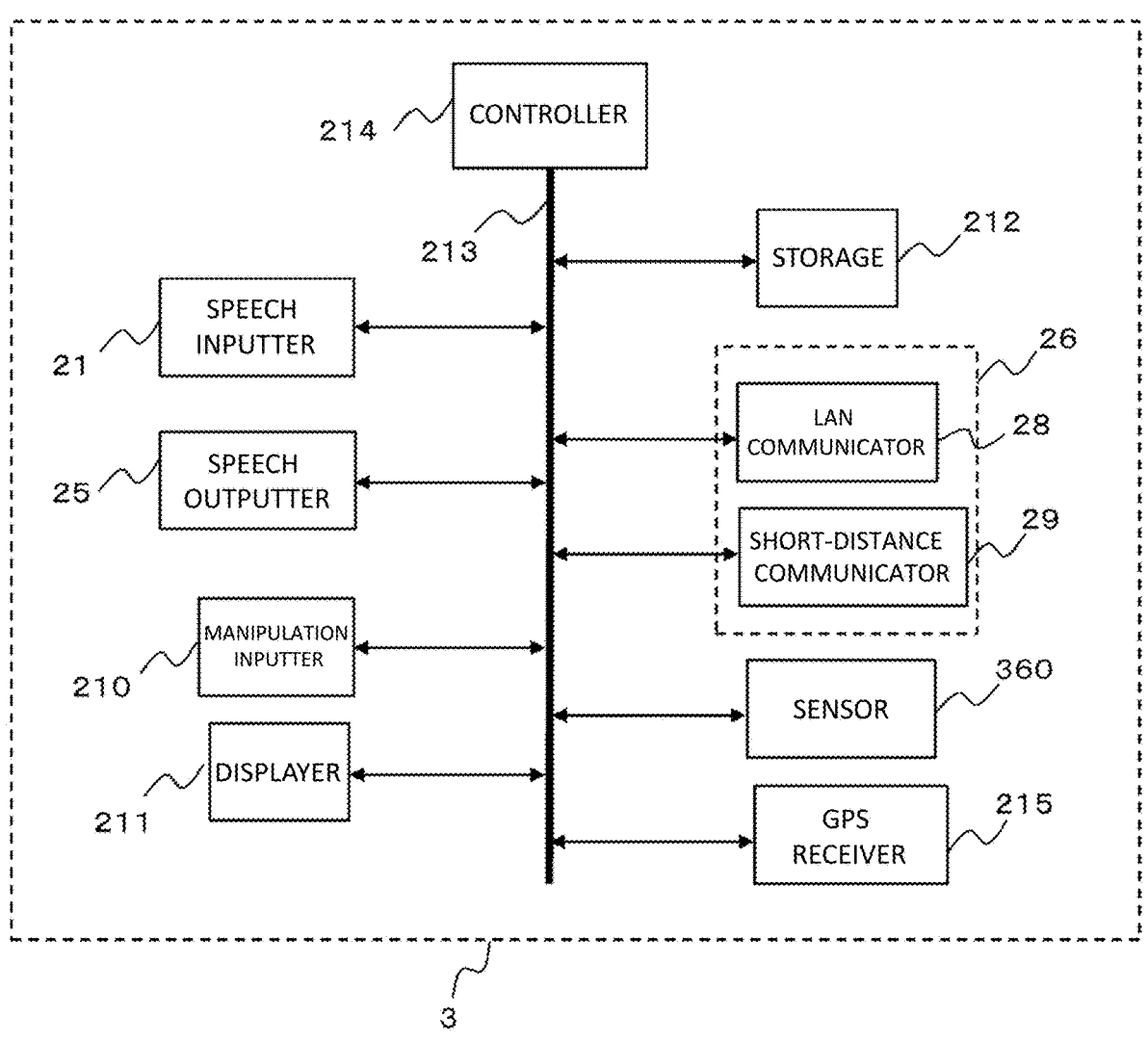
FIG. 12 is a diagram illustrating a configuration of a wearable terminal including a displayer used in the second embodiment.

FIG. 12 is a diagram illustrating the configuration of the smart watch 3. As illustrated in FIG. 12, the smart watch 3 includes a speech inputter 21 such as a mic, a speech outputter 25 such as a speaker, a short-distance communicator 26 for wireless communication with an external apparatus, a sensor 360 detecting the presence or absence of the wearing of the smart watch 3, the manipulation inputter 210 such as a key switch, the displayer 211 such as a LCD, and the storage 212 storing various data pieces.

In addition, the smart watch 3 includes a global positioning system (GPS) receiver 215 receiving the GPS position information transmitted from the GPS satellites, the controller 214 controlling the entire smart watch 3, and the system bus 213 to which each block is connected.

Among the blocks described above, hereinafter, a configuration specific to the smart watch 3 will be mainly described, and the description of the same blocks as the blocks of the mobile terminal 1 or the wireless earphone 2 described in FIG. 2, FIG. 3, and the like will be suitably omitted.

Since the smart watch 3 mainly functions as a clock, in general, time is displayed on the display screen of the displayer 211. On the other hand, since the smart watch 3 of this embodiment communicates with the mobile terminal 1 described above by a communication method such as Bluetooth (Registered Trademark) and is operated in cooperation with the mobile terminal 1, text display described below in FIG. 13 and the like may be performed on the display screen of the displayer 211.

In addition, the sensor 360 corresponds to the detector 36 of the wireless earphone 2 described above in FIG. 3, and has a function of detecting that the user wears the smart watch 3 by using an optical sensor or the like. On the other hand, the sensor 360 of the smart watch 3 generally has a measurement function for the healthcare of the user, or the like. In one specific example, for example, in order to measure the heart rate or the oxygen level in the bloodstream of the user (the wearer), the sensor 360 includes a light-emitting element such as a LED, and a light-receiving element detecting reflected light output from the e light-emitting element. In the case of such a configuration, it is possible to detect that the user wears the smart watch 3 through the existing sensor 360 (the measurement function).

In the speech conversation translation mode described above, the smart watch 3 of this embodiment displays the text of the conversation illustrated in FIG. 8 and FIG. 9 on the displayer 211. Therefore, the user is capable of checking the conversation contents on the text screen by viewing the display screen of the smart watch 3 at hand when necessary.

Figure 13:
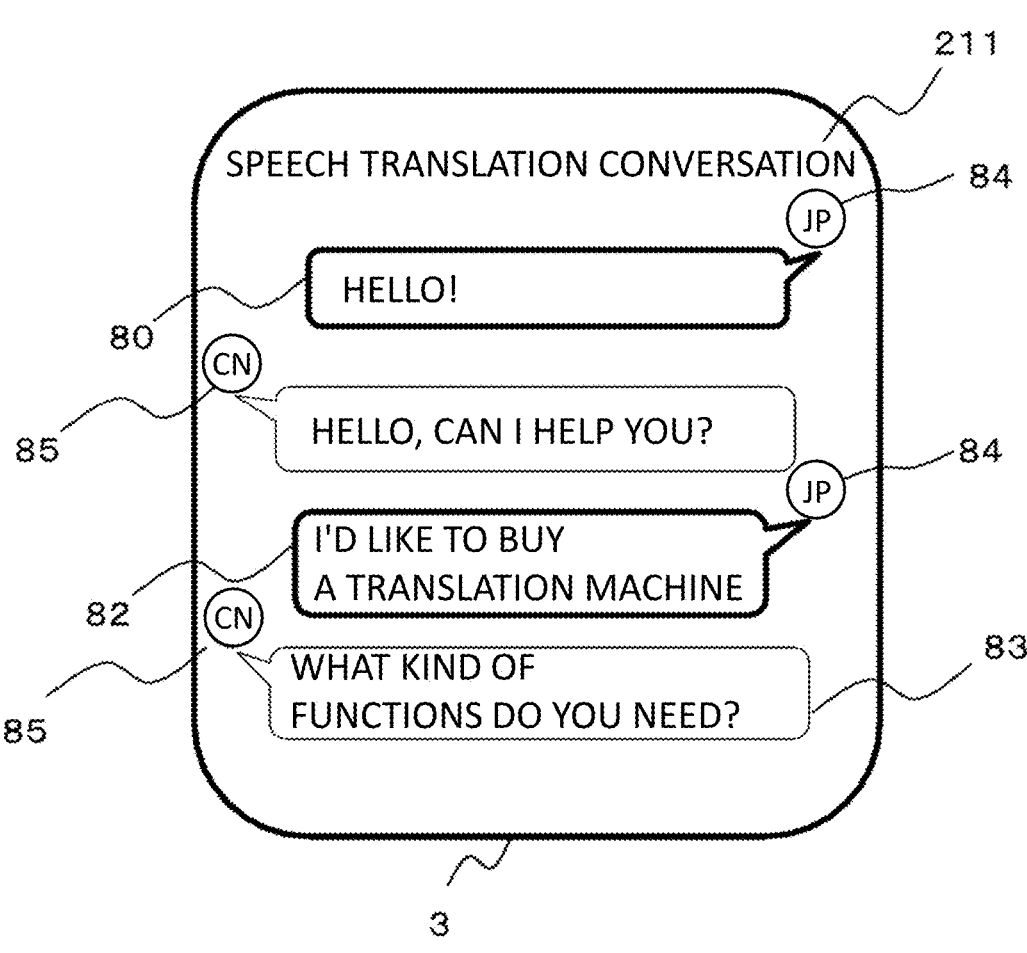
FIG. 13 is a diagram illustrating an example of wearable terminal screen display including the displayer used in the second embodiment.

An example of the text screen to be displayed on the displayer 211 of the smart watch 3 is illustrated in FIG. 13. As can be seen from the comparison between FIG. 13 and FIG. 8, display contents are the same as those in the example described above in FIG. 8, and thus, the description is omitted by applying the same reference numerals.

In this embodiment also using such a smart watch 3, when the user H1 (Japanese) and the sales assistant (Chinese) have a conversation, the user H1 is capable of touching the user switch button 86 illustrated in FIG. 8 to switch the language in the text display (refer to FIG. 9), and having a conversation in a state where such a mobile terminal 1 is passed to the sales assistant.

More specifically, in this case, the controller 214 of the mobile terminal 1 switches the text screen of the displayer 211 of the mobile terminal 1 to the display in the language 2 (the Chinese language), but does not transmit the text data in the language 2 to the smart watch 3. That is, only in a case where the text in the language 1 (the Japanese language) is newly displayed, the controller 214 of the mobile terminal 1 transmits the text data in the language 1 to the smart watch 3 (refer to S303 and S312 of FIG. 14).

Therefore, according to this embodiment, since it is sufficient to perform the manipulation of the mobile terminal 1 to switch the display screen (the language in the text display) to the minimum necessary (in this example, once), the usability of the user is improved.

Figure 14:
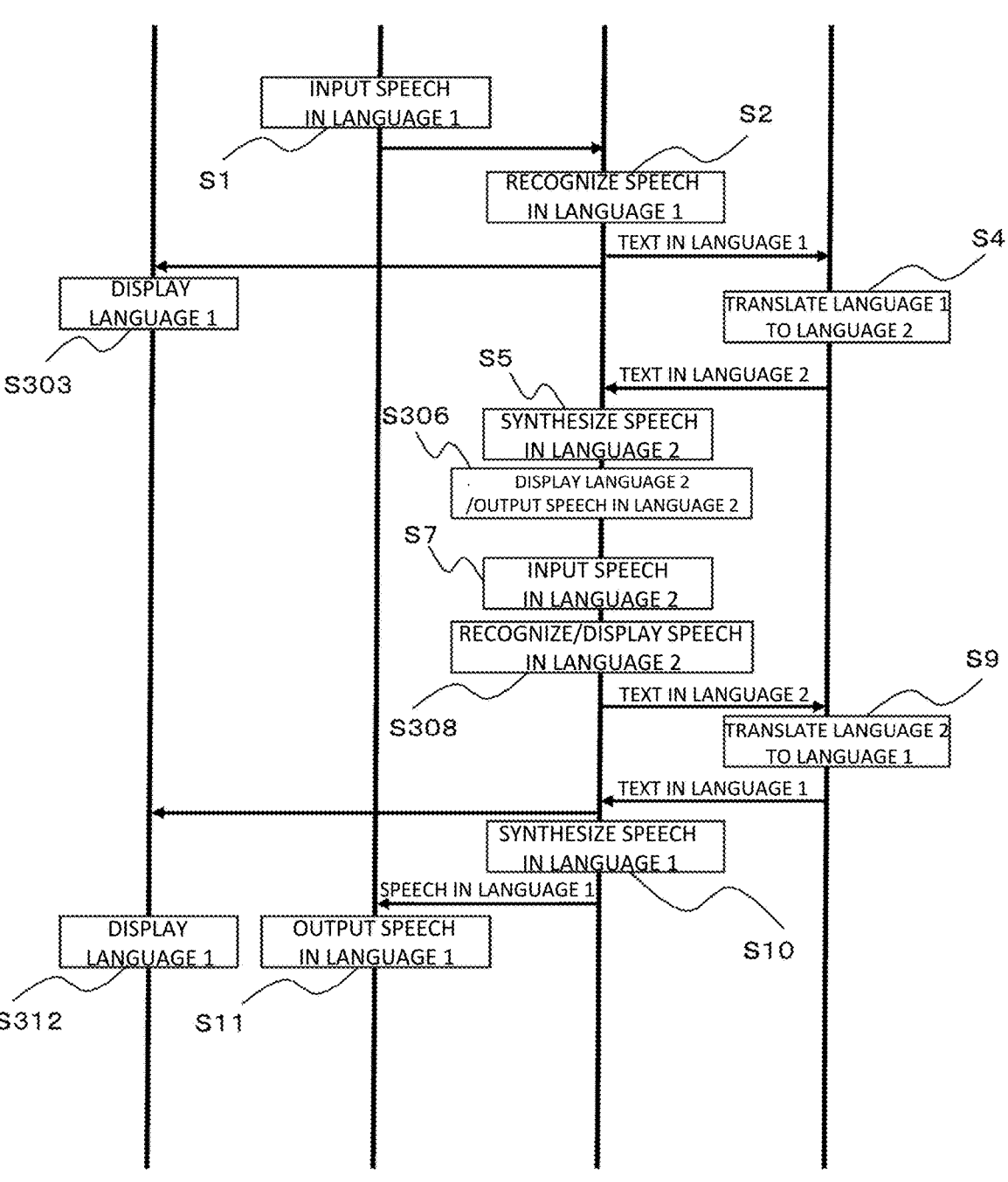
FIG. 14 is a diagram illustrating an example of an operation sequence in the second embodiment.
Figure 1:
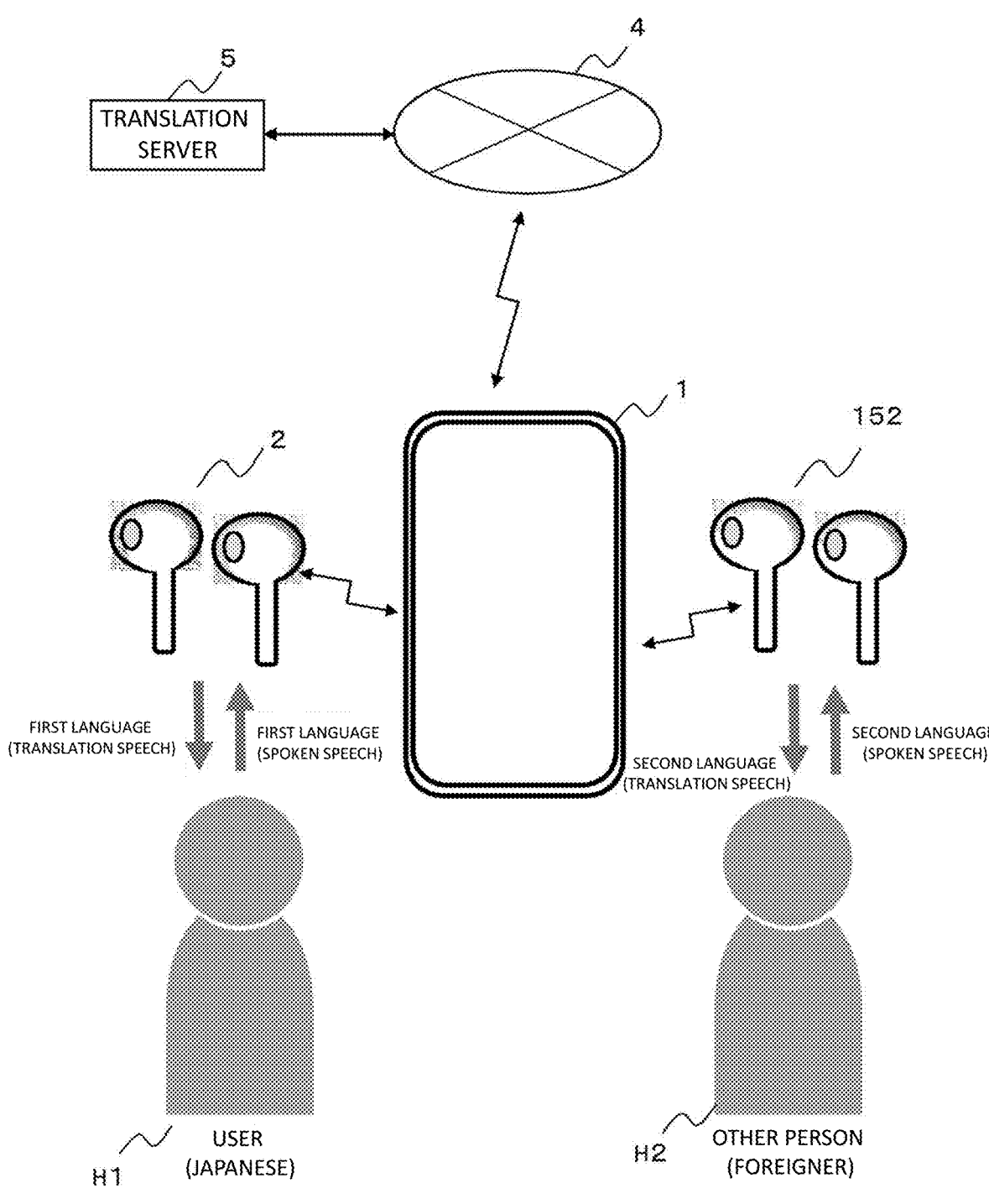

FIG. 14 is a diagram illustrating an operation sequence in this embodiment. For conciseness, in FIG. 14, the same reference numerals are applied to the same processing steps as the processing described above in FIG. 7, and the description thereof is omitted.

In steps S303 and S312 of FIG. 14, the controller 214 of the mobile terminal 1 transmits the text in the language 1 (the character string in the Japanese language) to the smart watch 3, and displays the text on the smart watch 3.

That is, as can be seen from the comparison between FIG. 7 and FIG. 14, in this embodiment, the controller 214 of the mobile terminal 1 controls each part such that the text display and the speech output in the "language 2" are performed in the mobile terminal 1 (refer to S306 and S308), and the text display in the language 1 is performed in the smart watch 3 instead of the mobile terminal 1 (also refer to S3 and S12 of FIG. 7).

According to this embodiment of performing such an operation, since the user H1 is capable of continuing the conversation in a state where the mobile terminal 1 is passed to the sales assistant, there are also advantages that it is possible to minimize a physical contact between the speakers and to have a conversation while ensuring a so-called social distance.

Note that, in this embodiment, the controller 214 of the mobile terminal 1 performs processing in which the text of the conversation contents is displayed on the screen of the smart watch 3 in cooperation with the smart watch 3, and the speech of the conversation contents is output to the wireless earphone 2 in cooperation with the wireless earphone 2. In other words, in the example described above in FIG. 14, it is premised that the text display and the speech output of the conversation contents are performed in separate wearable terminals.

On the other hand, this embodiment is not limited to the example described above, and the text display and the speech output of the conversation contents can be performed in one wearable terminal. As one non-restrictive specific example, by using a so-called smart glass in which a small retina projection apparatus, a mic, and an earphone are provided in a spectacle type wearable terminal that is not illustrated, the displayer of the smart watch 3 and the speech input/output of the wireless earphone 2 in this embodiment may be combined as one constituent.

Third Embodiment

Next, a third embodiment of the present invention will be described. FIG. 15 is a diagram illustrating the outline configuration of a speech translation system in the third embodiment of the present invention.

As can be seen from the comparison with FIG. 1, in the speech translation system of the third embodiment illustrated in FIG. 15, the wearable speech input/output apparatus 2 of the user H1 is connected to the mobile terminal 1, and a wireless speech input/output apparatus 152 owned by the other person H2 (for example, the foreigner) to be the conversation person is connected to the mobile terminal 1. Hereinafter, each of the wireless speech input/output apparatuses 2 and 152 will be described as the wireless earphone, unless otherwise specified. In addition, since the configuration of the internal blocks or the like of the wearable speech input/output apparatus 152 is the same as that of the wireless earphone 2 described above in FIG. 3 and the like, the description is omitted.

The basic operation of the speech translation system of the third embodiment is the same as that in the first embodiment described above, except that the other person H2 performs the input/output of the speech by using the wearable speech input/output apparatus (in this example, the wireless earphone 152) of the other person H2 without using the mobile terminal 1, which is a great difference.

In this embodiment, setting of connecting the wireless earphone 152 of the other person H2 to the mobile terminal 1 of the user H1 is required, but both of the user H1 and the other person H2 are capable of using the own preferred (easy-to-use or favorite) wireless speech input/output apparatus (2, 152), and thus, there are advantages that it is possible to concentrate on the conversation.

Note that, the wearable speech input/output apparatus of the other person H2 may be a wired earphone with a mic instead of the wireless earphone 152, and for example, in a case where the mobile terminal 1 is provided with a connection terminal (a speech input/output terminal) of the earphone, connection setting is comparatively facilitated.

In addition, in the third embodiment, there is the same effect as that of the second embodiment described above, that is, there are also advantages that it is possible to minimize the physical contact between the speakers and to have a conversation while ensuring a constant distance (the social distance). Further, unlike the second embodiment described above, the speech translation system of the third embodiment may not use the speech inputter/outputter (201, 205) of the mobile terminal 1, and thus, it is considered that the speech translation system is preferably used in the conference and the like.

Note that, in the case of the third embodiment, as illustrated in FIG. 15, the user H1 and the other person H2 are capable of simultaneously having a conversation by connecting the wireless earphones (2, 152), but either the user H1 or the other person H2 is also capable of having a conversation by connecting the wireless earphone. In this case, in the setting mode described above, the user H1 may arbitrarily select connection only to the user H1, connection only to the other person H2, and connection to both of the user H1 and the other person H2 to be set for the wireless earphone.

In this case, the configuration of the first embodiment described above corresponds to a case where the "connection only to the user H1" is selected.

In contrast, in the case of the "connection only to the other person H2" is set, unlike the first embodiment, the other person H2 has a conversation through the wireless earphone 152. In this case, a relationship between the use language and the translation language is reversed, and the wireless earphone 152 of the other person H2 is used as the input/output terminal of the translation language.

Next, a method for performing setting of using the speech input/output apparatus (2, 152) of each of the user H1 and the other person H2 will be described. In one specific example, a speech input/output setting button is provided for each of two items of the "use language" and the "translation language" the screen display in the language registration mode illustrated in FIG. 6 such that a usable speech input/output apparatus can be set. In this case, setting of assigning the wireless earphone to the use language that has been already described may be the default.

In addition, as described above in the description of the language registration mode, a plurality of languages may be set by being prioritized for each of the language 1 and the language 2 translated to each other, instead of the registration of the use language and the translation language. In this case, an example of the setting screen is illustrated in FIG. 16.

Figure 16:
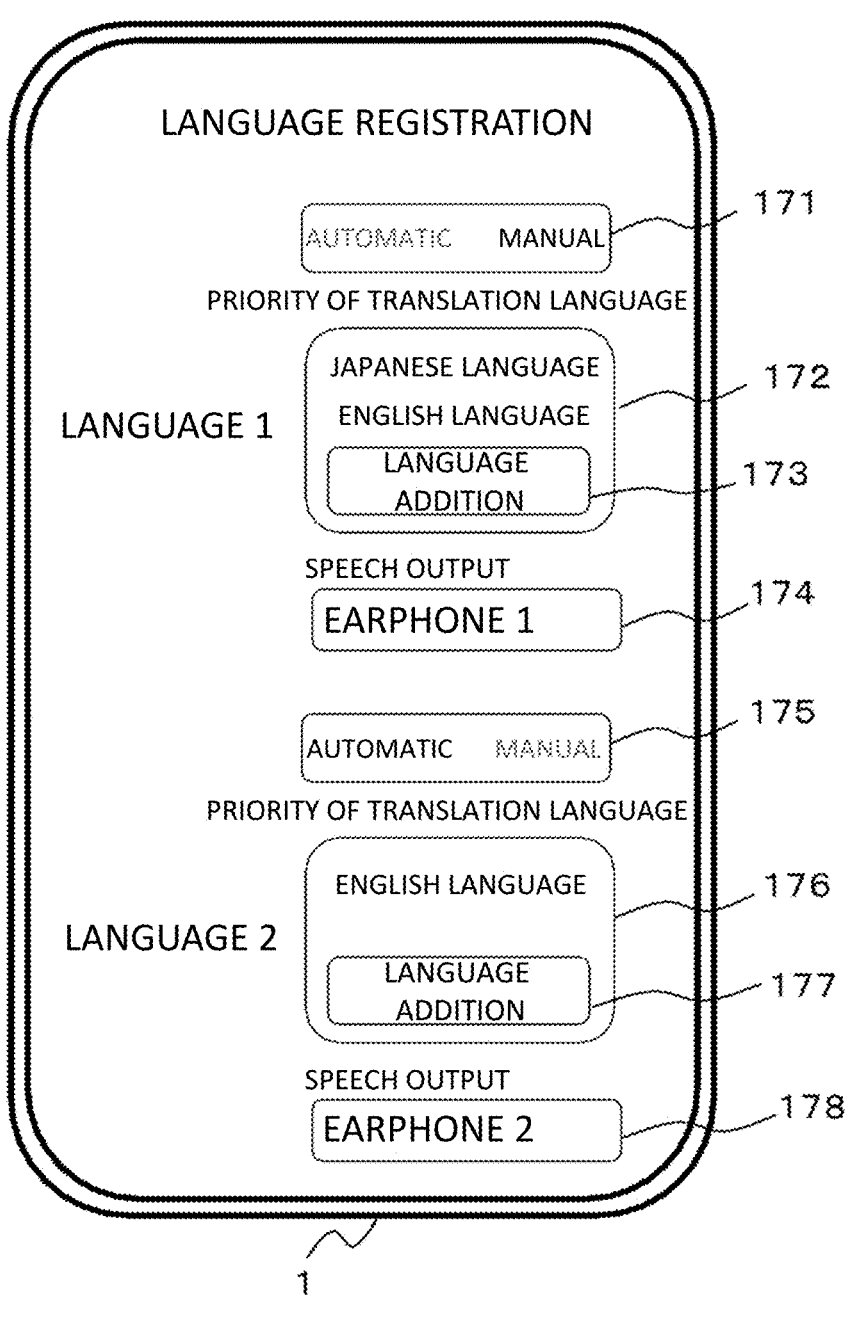
FIG. 16 is a diagram illustrating an example of screen display of a mobile terminal in a language registration mode in the third embodiment.

In FIG. 16, reference numerals 171 and 175 are an automatic/manual selection button, reference numerals 172 and 176 are a translation language display section, and reference numerals 173 and 177 are a language addition button, and the translation language can be set by the same operation as that of the setting screen of the translation language in FIG. 6. In addition, reference numerals 174 and 178 are a speech output setting button, and in a case where such buttons are touched, the controller 214 displays one or a plurality of wireless earphones, headsets, and the like, for which the connection setting has been already performed, in addition to the speaker of the mobile terminal 1, such that the user H1 is capable of performing the selection.

Note that, the input of the speech may be automatically set to correspond to the set speech output apparatus such that the user is capable of performing the selection.

According to the third embodiment, since both of the user H1 and the other person H2 who are the speakers of different languages are capable of having a conversation by using the speech input/output apparatus (2, 152) such as the wireless earphone, it is possible to have a comfortable communication without being affected by the ambient environment.

Figure 17:
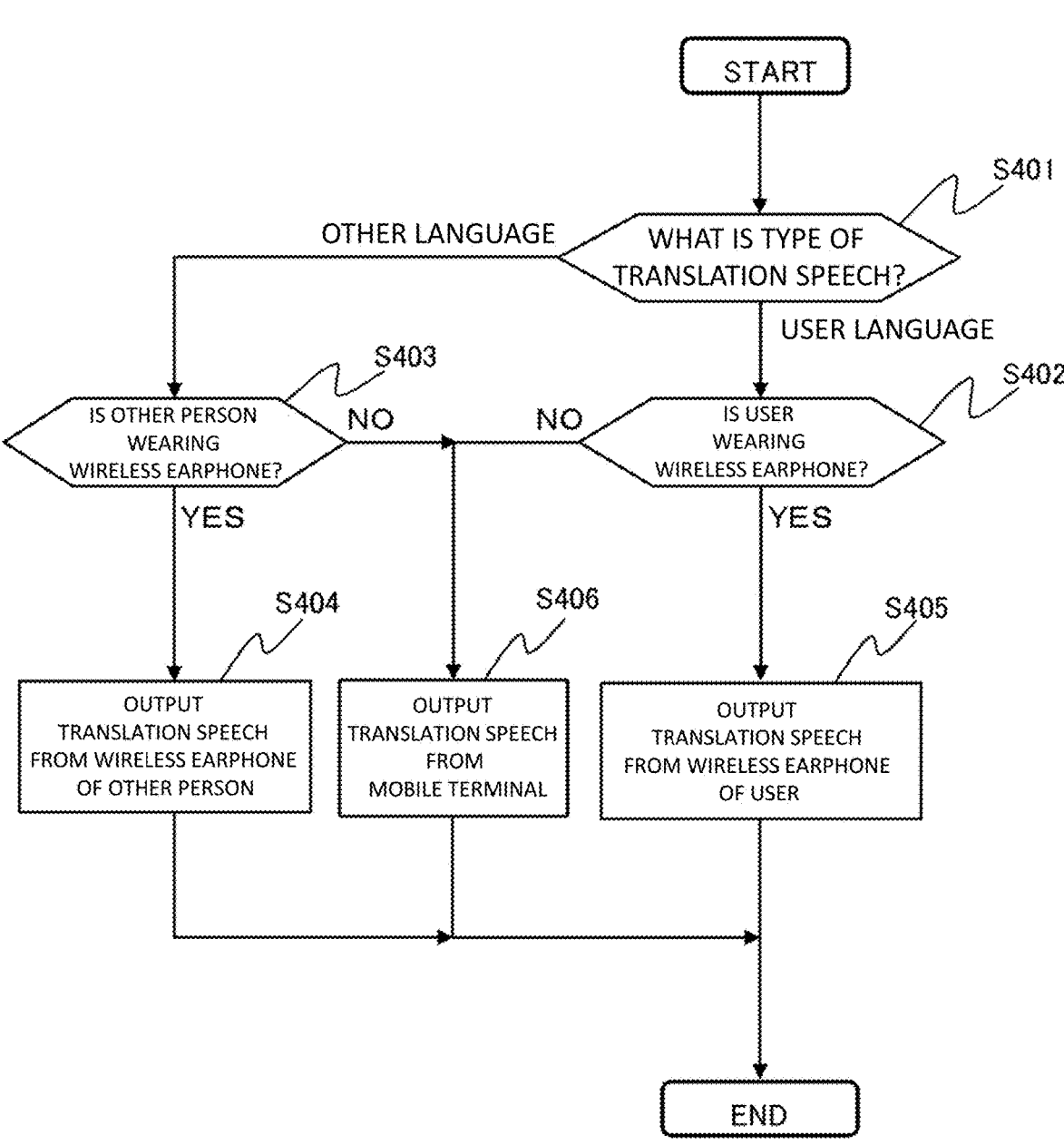
FIG. 17 is a flowchart illustrating processing of determining an output path of translation speech in the third embodiment.

FIG. 17 is a flowchart illustrating processing that is executed by the controller 214 of the mobile terminal 1 when determining or switching the output destination (the output path) of the translation speech, in the speech translation conversation mode of the third embodiment.

Note that, the processing of steps S401 to S406 in FIG. 17 is executed after the translated text data received from the translation server 5 is synthesized to the translation speech by the speech synthesizer 204 (suitably refer to FIG. 7 and the like).

The controller 214 determines whether the type of translation speech synthesized by the speech synthesizer 204 is the user language (the first language) or the other language (the second language) (step S401), proceeds to S402 in the case of the user language, and proceeds to S403 in the case of the other language.

In step S402, the controller 214 determines whether the user is wearing the wireless earphone 2 by acquiring the detection result of the detector 36 of the wireless earphone 2, proceeds to S405 in the case of YES, that is, in a case where the user is wearing the wireless earphone, and proceeds to S406 in the case of NO, that is, in a case where the user is not wearing the wireless earphone.

Then, the controller 214 performs processing of switching the output path such that the translation speech in the user language is output from the wireless earphone 2 in a case where the user H1 (in this example, Japanese) is wearing the wireless earphone 2 (S405), and the translation speech is output from the speech outputter 205 of the mobile terminal 1 in a case where the user is not wearing the wireless earphone (S406).

On the other hand, in step S403, the controller 214 acquires the detection result of the detector 36 of the wireless earphone 152, determines whether the other person is wearing the wireless earphone 152, proceeds to S404 in the case of YES, that is, in a case where the other person is wearing the wireless earphone, and proceeds to S406 in the case of NO, that is, in a case where the other person is not wearing the wireless earphone.

Then, the controller 214 performs processing of switching the output path such that the translation speech in the other language is output from the wireless earphone 152 in a case where the other person H2 (in this example, the foreigner) is wearing the wireless earphone 152 (S404), and the translation speech is output from the speech outputter 205 of the mobile terminal 1 in a case where the other person is not wearing the wireless earphone (S406).

By determining or switching the output path of the translation speech as described above, for example, even in a case where the wireless earphone 2 (152) temporarily detached, it is possible for each of the speakers to listen to the translation speech based on the speaking of the person by the speaker output of the mobile terminal 1 and to smoothly continue the conversation.

Note that, the flowchart illustrated in FIG. 17 can also be applied to the first embodiment (that is, the wireless earphone 152 is not used) described above, in the same manner. In this case, when it is determined that the type of translation speech is the other language (second language) in step S401, the controller 214 may proceed to step S406 by skipping the processing of step S403 and S404.

In addition, the flowchart illustrated in FIG. 17 can also be applied to a case where the user H1 does not use the wireless earphone 2 and only the other person H2 uses the wireless earphone 152 in the third embodiment, in the same manner. In this case, when it is determined that the type of translation speech is the user language (the first language) in step S401, the controller 214 may proceed to step S406 by skipping the processing of step S402 and S405.

Fourth Embodiment

Next, a fourth embodiment of the speech translation system will be described.

In each of the embodiments described above, in a case where the user H1 listen to the translation speech by the wireless earphone 2, it is assumed that the controller 214 performs control such that only the translation speech can be heard from the wireless earphone 2. In this case, in the speech translation conversation mode described above, it is considered that the usability is excellent from the viewpoint that it is possible to concentrate on a conversation with the person (the sales assistant or the other person H2 described above).

On the other hand, the other usage or speech translation mode, the user H1 may desire to listen to the ambient speech from the wireless earphone 2 together with the translation speech. For example, in a case where the announcement is heard in the speech translation mode, it may be convenient to grasp ambient information (for example, the reaction of the other passenger, and the like) by a sound.

Therefore, in the fourth embodiment, the speech is output from the wireless earphone 2 by adding the translation speech and the ambient speech.

Here, processing of adding the translation speech and the ambient speech may be performed by the speech signal processor 202 of the mobile terminal 1, or may be performed by the speech signal processor 34 of the wireless earphone 2.

Here, in a case where the speech is output from the speaker of the mobile terminal 1, in particular, in a case where the wireless earphone 2 is not connected to the mobile terminal 1 or is not worn on the user H1, it is necessary to add the ambient sound and the translation speech by the speech signal processor 202 of the mobile terminal 1, or the like.

Figure 18:
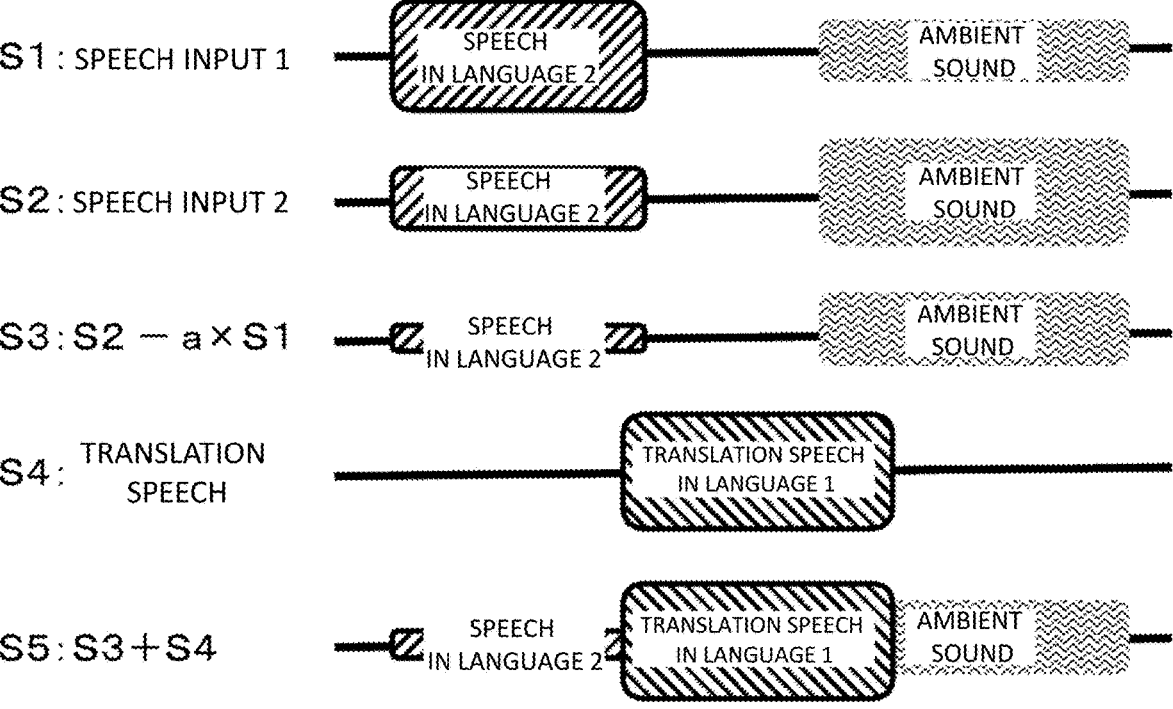
FIG. 18 is an explanatory diagram of speech signal processing in a fourth embodiment.

FIG. 18 is a schematic view of the speech signal for illustrating signal processing in a case where the translation speech is output by being added with the ambient speech. FIG. 18 schematically illustrates that a signal S1 indicates a signal waveform of speech input 1 and a signal S2 indicates a signal waveform of speech inputter 2, in which a horizontal axis indicates time.

The speech input 1 and the speech input 2 are inputs from the mic at different positions, and may be input from the speech inputter 201 of the mobile terminal 1, or may be input from the mic of the wireless earphone 2.

A signal S3 is a signal obtained by amplifying the signal S1 at a constant amplification factor and subtracting the signal S1 from the signal S2, and is a signal obtained by attenuating the speech in the language 2 to extract the ambient sound using the fact that a signal amount of the speech in the language 2 (for example, the French language) and a signal amount of the ambient sound are different between the signal S1 and the signal S2.

A signal S4 is a translation speech signal obtained by recognizing the speech in the language 2 with the speech recognizer 203 using the signal S1, translating the speech to the language 1 with the translation server 5, and then, converting the speech to the speech in the language 1 with the speech synthesizer 204. Since such a translation speech signal S4 is generated through the speech recognition (the text generation), the translation processing, and the like, described above, with respect to the speech in the language 2, it is found that the translation speech signal is generated with a constant delay time, compared to the speech in the language 2 (refer to the signal S1).

A signal S5 is a speech signal obtained by adding the signal S3 and the translation speech signal S4, and it is possible to generate a signal obtained by adding the translation speech in the language 1 to the ambient sound in which the speech in the language 2 is suppressed.

Note that, a speech signal of the ambient sound in which the translation source language is suppressed may be generated by using the other method.

In the example illustrated in FIG. 18, a method for suppressing the predetermined language speech by using the fact that in the speech input from different inputs (mics), a signal level of the environment speech and a signal level of the language speech are different from each other is described, but the present invention is not limited thereto. As another example, in the speech recognizer 203 (FIG. 2), it is also possible to recognize a predetermined language speech and to output a signal obtained by selectively removing the recognized predetermined language speech from the input signal.

By adding the translation speech to the signal generated as described above, it is possible to generate a desired speech signal.

For example, when the Japanese user H1 has a conversation with a person speaking the French language, it is easy to understand the speech in the Japanese language in the case of suppressing the French language from the ambient sound.

As described above, by adding the speech in the translation language to a signal in which the speech in the original language (in this example, the French language) is suppressed, it is easy to listen to the speech in the translation language and to grasp the ambient sound and the situation.

In addition, in the language speech for attenuating the signal level, only the translation language speech to be a translation target may be selectively attenuated, or signal processing may be performed such that the language speech is entirely attenuated or the entire language speech other than the use language is attenuated.

An attenuation intensity of the language speech may be changed in accordance with the environment such as the level of the ambient sound. Further, by using a video or the like that is imaged by the camera 217 of the mobile terminal 1, processing such as suppressing the language speech of recognized speaker in front (for example, the sales assistant or the other person H2 described above) or limiting the language speech to the translation target may be performed.

Note that, in this embodiment, the operation of the speech translation mode has been described as an example, but by applying the same processing to the speech translation conversation mode or the like, the environment speech and the translation speech may be added and output after suppressing the input signal level of the translation speech. By performing such processing, it is possible for the user H1 to listen to the translation speech more clearly while grasping the ambient situation.

Fifth Embodiment

A fifth embodiment of the present invention will be described. In the fourth embodiment described above, a method for facilitating the listening of the speech in the translation language with respect to the spoken contents of the person by suppressing the speech in the language 2 (for example, the French language) and adding the translation speech translated to the language 1 (the Japanese language) is described. In this embodiment, the language 2 is suppressed by a method different from the method described above.

The signal S5 in FIG. 18 described above as the fourth embodiment is generated by simply adding the signal S3 and the translation speech signal S4. In this case, the signal S3 that is the suppressed speech in the language 2 is output to the mobile terminal 1 (that is, to the user H1) until the translation speech signal S4 is generated with a constant delay time.

Therefore, a case is considered in which the speech in the language 2 is suppressed until the translation speech signal S4 translated to the language 1 is generated, and the user H1 feels unnatural in accordance with the situation, regardless of the fact that the person (for example, the sales assistant or the other person H2 described above) starts to speak in the language 2. For example, in a case where the speech in the language 2 (the input period) is long, and a period until the translation speech signal S4 translated to the language 1 is generated is long, the user H1 may have anxiety such as "The speech translation system may not be operated normally".

In order to handle the situation as described above, in the fifth embodiment, the language 2 is suppressed by the method different from the method of the fourth embodiment.

Figure 19:
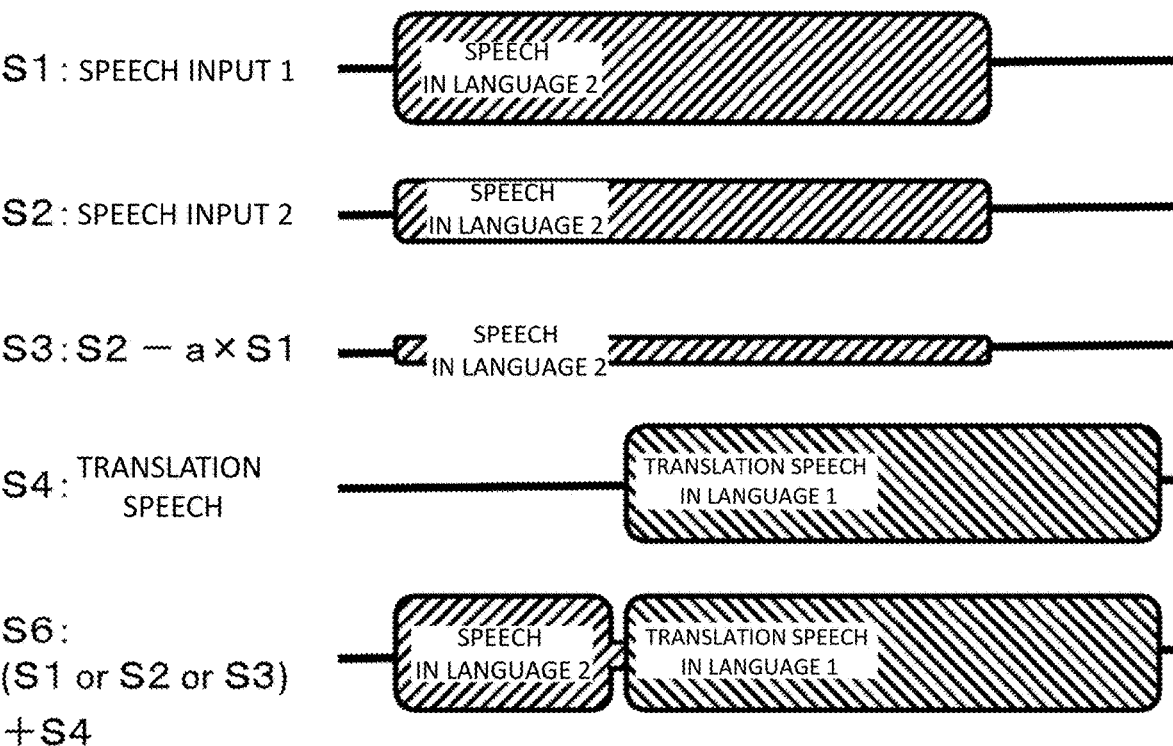
FIG. 19 is an explanatory diagram of speech signal processing in a fifth embodiment.

Here, FIG. 19 is a diagram for illustrating signal processing in the fifth embodiment, in which the time is shifted from the left side to the right side as with FIG. 18. In addition, it is assumed that the signals S1, S2, S3, and S4 in FIG. 19 are the same as those illustrated in FIG. 18, and are suppressed by the same method.

In contrast, a signal S6 in FIG. 19 is the speech signal obtained by adding the speech in the language 2 and the speech in the language 1, and the speech in the language 2 is added by being selected from the signals S1, S2, and S3.

In one specific example, the speech signal processor 202 selects the speech signal S1 in the language 2 that is the maximum volume immediately before the translation speech in the language 1 is generated, and switches to output the speech signal S3 in the language 2 that is the minimum volume immediately before the translation speech in the language 1 is generated, under the control of the controller 214. As described above, by switching the volume of the speech in the language 2, it is possible to obtain an effect of reducing unnaturalness when the person (the sales assistant or the other person H2 described above) starts to speak in the language 2.

Figure 20:
FIG. 20 is an explanatory diagram of the speech signal processing in the fifth embodiment.

As another specific example, it is also possible to sequentially change (for example, decrease) the volume of the speech in the language 2 by using different methods. FIG. 20 illustrates a synthesized signal S7 as a different synthesis example of the speech signal obtained by adding the speech in the language 2 and the translation speech in the language 1.

In the example of such a synthesized signal S7, regarding the speech in the language 2, the signal S1 that is the maximum volume is initially selected, and the volume is gradually lowered from a predetermined period of time before the translation speech in the language 1 is generated. Then, the signal is switched to the signal S3 immediately before the translation speech in the language 1. As described above, by continuously changing the volume of the speech in the language 2, it is also possible to obtain the effect of reducing the unnaturalness when the user 2 starts to speak.

Note that, in this embodiment, the operation of the speech translation mode has been described as an example, and the same processing can also be applied to the speech translation conversation mode and the like.

As described above in detail, in each of the embodiments described above, by ensuring the plurality of input/output paths (for example, the mobile terminal 1 and the wireless earphone 2) of the speech and automatically outputting the translation speech in the output mode according to the translation condition, it is possible to attain the translation processing apparatus with a simple manipulation and excellent usability. In addition, according to the mobile terminal 1 having various convenient functions as described above, the manipulation is simple and the usability is greatly improved, compared to the related art.

In addition, the embodiments described above or modification examples are merely a specific example for implementing the present invention, and the technical scope of the present invention is not construed to be limited by the embodiments and the modification examples. That is, the present invention may be implemented in various forms without departing from the gist or the essential characteristics thereof.

REFERENCE SIGNS LIST

1 Mobile terminal (speech translation processing apparatus)
2 Wearable speech input/output apparatus (wireless earphone with mic)
3 Smart watch 4 Network
5 Translation server
36 Detector
50 to 55 Selection button
60 Use language (first language) setting button
61 Translation language (second language) automatic/manual selection button
62 Translation language display section
63 Language addition button
80 to 83, 100 to 103 Message section
84, 85 Language mark
86 User switch button
152 Other wearable speech input/output apparatus
202 Speech signal processor
203 Speech recognizer
204 Speech synthesizer
206 Communicator
211 Displayer (switch displayer)
214 Controller (translation speech output controller, translation language setter)
216 GPS receiver (position acquirer)
H1 User
H2 Other person

The invention claimed is:

1. A speech translation processing apparatus including a speech inputter and a speech outputter operated in cooperation with a wearable speech input/output apparatus worn on a user, the speech translation processing apparatus comprising:

a translation speech acquirer acquiring translation speech in a user language or the other language that is translated and generated on the basis of a spoken speech in the user language or the other language input through the wearable speech input/output apparatus or the speech inputter;

a controller performing control such that the acquired translation speech is output from at least one of the speech outputter and the wearable speech input/output apparatus in an output mode according to a translation condition;

a character string acquirer acquiring a spoken character string of the spoken speech in the input user language or the input other language, and a translation character string obtained by translating the spoken character string to the other language or the user language; and a switch displayer performing switch display such that the acquired spoken character string and the acquired translation character string are sequentially displayed in either the user language or the other language, in accordance with an instruction of the user, wherein the controller is configured to:

output the translation speech based on the spoken speech input from the speech inputter of the speech translation processing apparatus from the wearable speech input/output apparatus;

perform control such that the translation speech based on the spoken speech input from the wearable speech input/output apparatus is output from the speech outputter;

in case that an erroneous translation exceeds a certain amount, control displaying a warning;

control changing the translation character string; and output the translation speech based on the translation character.

2. The speech translation processing apparatus according to claim 1, wherein when the wearable speech input/output apparatus is not worn on the user, the controller performs control such that the entire translation speech based on the spoken speech is output from the speech outputter.

3. The speech translation processing apparatus according to claim 1, further comprising a translation language setter setting one or more languages to be a mutual translation language with the user language as the other language by registering one language among a plurality of types of processible languages as the user language spoken by the user.

4. The speech translation processing apparatus according to claim 3, further comprising a position acquirer acquiring a current position of the speech translation processing apparatus from position information of a positioning system, wherein the translation language setter sets one or more mutual translation languages as the other language, on the basis of the current position.

5. The speech translation processing apparatus according to claim 1, wherein the wearable speech input/output apparatus is a wireless earphone with a mic.

6. The speech translation processing apparatus according to claim 3, wherein when the other wearable speech input/output apparatus worn on the other person other than the user is further connected, the controller performs control such that a speech signal based on a character string in the other language is output from the other wearable speech input/output apparatus.

7. The speech translation processing apparatus according to claim 1, wherein the translation speech acquirer includes a speech synthesizer acquiring a translation character string generated on the basis of the spoken speech and generating the translation speech from the translation character string.

8. The speech translation processing apparatus according to claim 7, further comprising a recording medium recording a pre-translation character string and the translation character string, wherein the controller performs control such that the pre-translation character string and the translation character string are read out from the recording medium, in accordance with the instruction of the user, and a speech signal is synthesized by the speech synthesizer.

9. The speech translation processing apparatus according to claim 8, further comprising:

a speech recognition processor generating a spoken character string by recognizing the language of the spoken speech; and a communicator transmitting the generated spoken character string and the generated translation language to an external translator and receiving the translation character string obtained by translating the spoken character string to the translation language from the translator.

10. The speech translation processing apparatus according to claim 8, further comprising:

a speech recognition processor generating a spoken character string by recognizing the language of the spoken speech; and a translator translating the spoken character string to a translation character string in a designated language and outputting the translation character string to the translation speech generator.

11. The speech translation processing apparatus according to claim 1, wherein the translation condition is any one or more of attribution of the speech, an input path of corresponding spoken speech, an operation mode of the apparatus, and a wearing state of the wearable speech input/output apparatus.

12. The speech translation processing apparatus according to claim 1, wherein the controller performs control such that a signal after suppressing a signal input from the speech inputter or the wearable speech input/output apparatus is output by adding the translation speech to the signal.

* * * * *